US012692812B2

(12) United States Patent
Geisick et al.

(10) Patent No.: US 12,692,812 B2
(45) Date of Patent: Jul. 28, 2026

(54) SYSTEMS AND METHOD FOR VEHICLE THERMAL MANAGEMENT

(71) Applicant: Deere & Company, Moline, IL (US)

(72) Inventors: Bryan T. Geisick, Cedar Falls, IA (US); Scott R. Miles, Cedar Falls, IA (US)

(*) Notice: Subject to any disclaimer, the term of this patent is extended or adjusted under 35 U.S.C. 154(b) by 12 days.

(21) Appl. No.: 18/808,473

(22) Filed: Aug. 19, 2024

(65) Prior Publication Data

US 2026/0049567 A1 Feb. 19, 2026

(51) Int. Cl.
*F01P 7/14* (2006.01)
*F02M 21/02* (2006.01)
(Continued)

(52) U.S. Cl.
CPC ........... *F01P 7/14* (2013.01); *F02M 21/0206* (2013.01); *F02M 21/0209* (2013.01);
(Continued)

(58) Field of Classification Search
CPC ... F01P 7/14; F02M 21/0206; F02M 21/0209; F02M 21/0215; F02M 21/0221
See application file for complete search history.

(56) References Cited

U.S. PATENT DOCUMENTS 2,409,611 A * 10/1946 Bodine .................. F02M 69/00 62/48.1
9,752,514 B2 * 9/2017 Amaral .................. F02M 43/04
(Continued)

FOREIGN PATENT DOCUMENTS

EP 2565436 A1 3/2013
JP 2011122542 A 6/2011

OTHER PUBLICATIONS

Woodward Catalog 52122 (Revision H)—Industrial Controls Product Line, Apr. 2011, Colorado, www.woodward.com (46 pages).
(Continued)

*Primary Examiner* — Kevin A Lathers
(74) *Attorney, Agent, or Firm* — KLINTWORTH & ROZENBLAT LLP

(57) ABSTRACT

A system and method for thermal management for a work vehicle having an engine and a non-engine heat-generating component is disclosed. A fuel tank configured to store fuel in a liquid or gaseous state and fuel flow lines are configured to deliver the fuel from the fuel tank to the engine for combustion of the fuel and to utilize all or a portion of the fuel for cooling to cool one or more components of the engine or a cooling body of the non-engine heat-generating component or both. A thermal expansion valve is coupled to the fuel flow lines intermediate the fuel tank and the engine and is configured to deliver all or the portion of the fuel utilized for cooling through an orifice such that the fuel undergoes a pressure reduction, including changing from a liquid state to a gaseous state if the fuel is in a liquid state when stored in the fuel tank, and inducing a heat of vaporization to absorb thermal energy in the one or more components of the engine or the cooling body of the non-engine heat-generating component. All or the portion of the fuel utilized for cooling is delivered to the engine for combustion after passing through the one or more components of the engine or the cooling body of the non-engine heat-generating component.

20 Claims, 11 Drawing Sheets

(51) Int. Cl.
*F02M 31/02* (2019.01)
*F02M 31/20* (2006.01)

(52) U.S. Cl.
CPC .... *F02M 21/0215* (2013.01); *F02M 21/0221* (2013.01); *F02M 21/0239* (2013.01); *F02M 21/0287* (2013.01); *F02M 31/02* (2013.01); *F02M 31/20* (2013.01); *F01P 2007/146* (2013.01)

(56) References Cited

U.S. PATENT DOCUMENTS

2003/0221433 A1* 12/2003 Gustafson ............. F02D 19/022
62/48.1
2008/0078363 A1* 4/2008 Apperson ............... F02B 21/00
123/557

OTHER PUBLICATIONS

Woodward Streamline Product Catalog 52143—Streamline Fuel Systems for LPG and Natural Gas Engines, www.woodward.com/fsp, undated admitted prior art (122 pages).

* cited by examiner

SYSTEMS AND METHOD FOR VEHICLE THERMAL MANAGEMENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to internal combustion engine systems for work vehicles and thermal management for work vehicles.

BACKGROUND OF THE DISCLOSURE

Heavy-duty work vehicles, such as those used in the agricultural, construction, forestry, and mining industries, may utilize various propulsion systems and drive trains to provide tractive power to the ground-engaging wheels or tracks for travel and work operations of the work vehicle. Internal combustion engines that combust petroleum-based fuels (e.g., gasoline and diesel) have been used to generate power necessary to drive such propulsion systems and drive trains. However, engine systems that combust fuels with low or no carbon content are becoming of interest as such fuels may be produced from renewable sources and/or combustion of such fuels May generate fewer hazardous gases that have to be processed and/or emitted from the work vehicle.

SUMMARY OF THE DISCLOSURE

The present disclosure provides a thermal management system for a work vehicle having an engine and a non-engine heat-generating component that includes a fuel, a fuel tank configured to store fuel in a liquid or gaseous state, fuel flow lines configured to deliver the fuel from the fuel tank, and a thermal expansion valve. Fuel is delivered to the engine for combustion of the fuel and to utilize all or a portion of the fuel for cooling one or more components of the engine, a cooling body of the non-engine heat-generating component, or both. The thermal expansion valve is coupled to the fuel flow lines intermediate the fuel tank and the engine and configured to deliver all or the portion of the fuel utilized for cooling through an orifice such that the fuel undergoes a pressure reduction, including changing from a liquid state to a gaseous state if the fuel is in a liquid state when stored in the fuel tank, and inducing a heat of vaporization to absorb thermal energy in the one or more components of the engine or the cooling body of the non-engine heat-generating component. All of the portion of the fuel utilized for cooling is delivered to the engine for combustion after passing through the one or more components of the engine or the cooling body of the non-engine heat-generating component.

The present disclosure also provides a method of cooling an engine and a non-engine heat-generating component of a work vehicle that includes delivering fuel from a fuel tank to the engine through fuel flow lines for combustion of the fuel, utilizing all or a portion the fuel delivered to the engine for cooling to cool one or more components of the engine or a cooling body of the non-engine heat-generating component or both, and operating a thermal expansion valve. The thermal expansion valve is coupled to the fuel flow lines intermediate the fuel tank and the engine and is operated to deliver all or the portion of the fuel utilized for cooling through an orifice and thereby causing the fuel to undergo a pressure reduction, including changing the fuel from a liquid state to a gaseous state if the fuel is in a liquid state when stored in the fuel tank, and inducing a heat of vaporization to absorb thermal energy in the one or more components of the engine or the cooling body of the non-engine heat-generating component. The method further includes delivering all or the portion of the fuel utilized for cooling to the engine for combustion after passing through the one or more components of the engine or the cooling body of the non-engine heat-generating component.

The present disclosure further discloses a control system for thermal management of a work vehicle having an engine and a non-engine heat-generating component that includes fuel flow lines configured to deliver the fuel from a fuel tank to the engine for combustion of the fuel and to utilize all or a portion of the fuel for cooling one or more components of the engine or a cooling body of the non-engine heat-generating component or both, wherein the fuel tank is configured to store fuel in a liquid or gaseous state. The control system further includes a controller having a processing and memory architecture and configured to execute instructions to operate a thermal expansion valve coupled to the fuel flow lines intermediate the fuel tank and the engine and configured to deliver all or the portion of the fuel utilized for cooling through an orifice such that the fuel undergoes a pressure reduction, including changing from a liquid state to a gaseous state if the fuel is in a liquid state when stored in the fuel tank, and inducing a heat of vaporization to absorb thermal energy in the one or more components of the engine or the cooling body of the non-engine heat-generating component. In addition, all or the portion of the fuel utilized for cooling is delivered to the engine for combustion after passing through the one or more components of the engine or the cooling body of the non-engine heat-generating component.

In some aspects or embodiments, a cooling requirement of the cooling body is determined and the thermal expansion valve is operated in accordance with the cooling requirement. In some such aspects, the portion of the fuel that is utilized for cooling the cooling body and a remainder portion of the fuel delivered to the engine that bypasses the cooling body are determined in accordance with the cooling requirement.

In other aspects or embodiments, an air intake arrangement delivers ambient air to the engine without the ambient air passing through or being cooled by an intercooler or a charged air cooler, and the fuel absorbs thermal energy from the ambient air delivered to the engine.

In other aspects or embodiments, the non-engine heat-generating component is one of a hydraulic component, an electrical component, a radiator, a transmission, an exhaust gas recirculation system, and a charge air cooler.

In other aspects or embodiments, a heater is disposed between the orifice and an engine fuel intake of the engine to heat all or the portion of the fuel.

In other aspects or embodiments, a further valve is disposed between the fuel tank and the thermal expansion valve wherein the further valve is operated to deliver to the thermal expansion valve all or the portion of the fuel utilized to cool the one or more components of the engine without being utilized for cooling the cooling body.

In other aspects or embodiments, the fuel tank is configured to supply one of liquid petroleum gas, ethanol, methanol, methane, ammonia, natural gas, hydrogen, or a mixture thereof.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
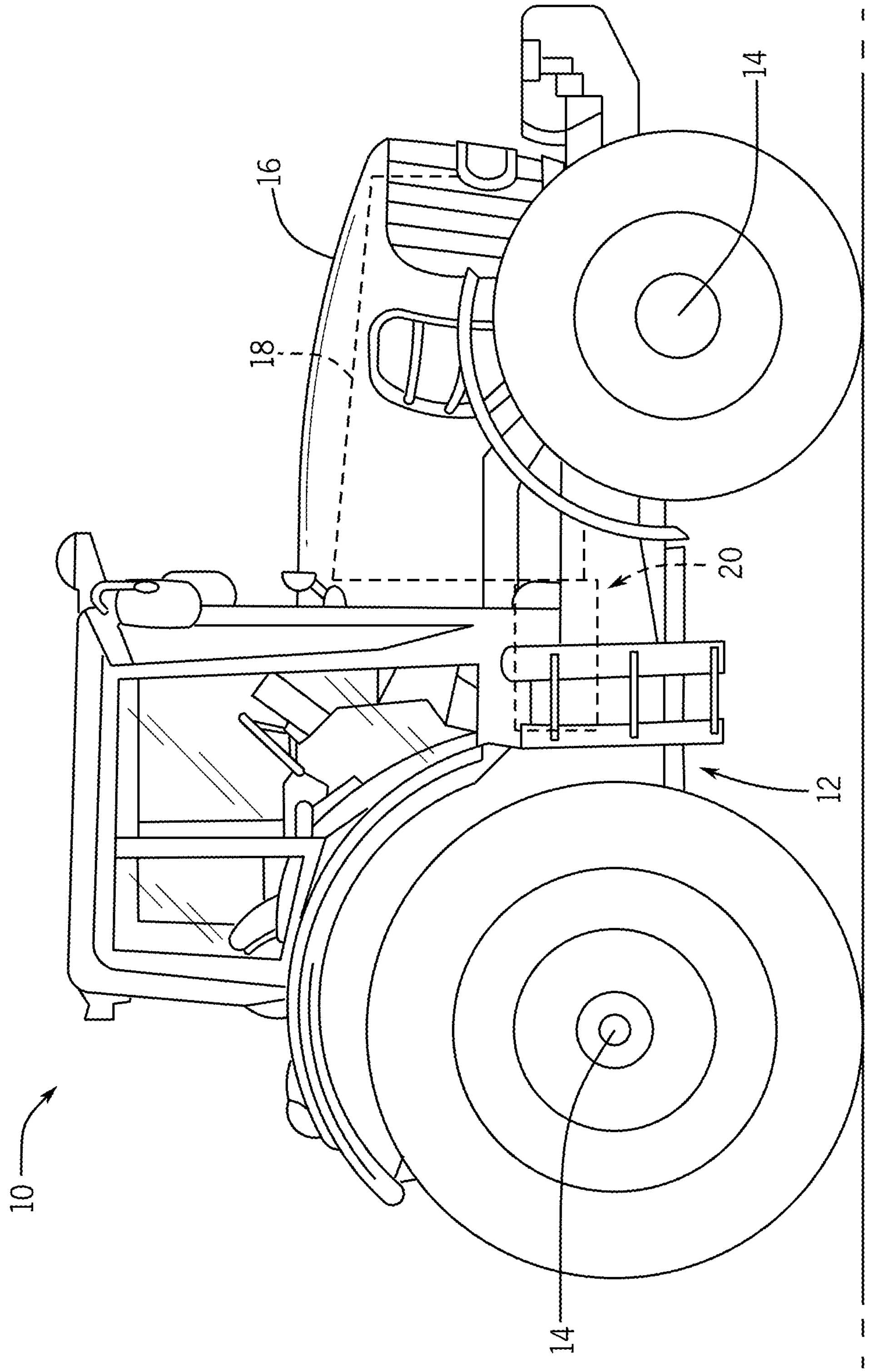
FIG. 1 is an example work vehicle in the form of an agricultural tractor in which a thermal management system of the present disclosure may be incorporated.

The following describes one or more example embodiments of the disclosed thermal management system for a work vehicle as shown in the accompanying figures of the drawings described briefly above. Various modifications to the example embodiments may be contemplated by one of skill in the art. Discussion herein focuses on the thermal management system being for a work vehicle, such as an agricultural tractor, but the thermal management system disclosed herein may be utilized in other contexts, including other work vehicle platforms in the agriculture, construction, forestry, mining, and other industries.

OVERVIEW

Fuel alternatives ("alternative fuels") to gasoline such as liquid petroleum gas, ethanol, methanol, methane, ammonia, natural gas, hydrogen, and the like and mixtures of such alternative fuels are gaining favor for use in spark ignited engines because such alternative fuels can be produced from renewable sources and/or combustion of these fuels produces exhaust gases having fewer harmful components than those produced by combustion of gasoline.

Table 1 below shows the available thermal energy, i.e., the Lower Heating Value (LHV) or energy density, and other properties of gasoline and various alternative fuels.

TABLE 1

| | LHV (MJ/kg) | Octane Rating | Air-Fuel Ratio | Storage Density (kg/m$^3$) | Vapor Density (kg/m$^3$) | Heat of Vaporization (kJ/kg) |
|---|---|---|---|---|---|---|
| Gasoline | 43.4 | 90 | 14.7 | 790 | 4.5 | 298 |
| Ammonia | 18.8 | 130 | 6 | 600 | 1.6 | 1372 |
| Natural Gas | 47.1 | 125 | 15 | 0.8 | 0.8 | n/a |
| Ethanol (100%) | 26.7 | 100 | 9 | 790 | 0.14 | 900 |
| Liquified Petroleum Gas | 45.5 | 103 | 15.7 | 550 | 1.7 | 428 |
| Methanol | 19.9 | 100 | 6.5 | 790 | 0.22 | 1165 |

As shown in Table 1, an alternative fuel may have a lower energy density than gasoline and requires higher mass flow rates through the engine to produce an equivalent amount of power compared to that produced by combustion of gasoline. However, the alternative fuel also may have higher octane numbers and thus an engine that combusts such fuel may have a higher brake thermal efficiency (BTE) with proper thermal management.

Further, the alternative fuels shown in Table 1 that are typically stored in a liquid phase have a high heat of vaporization and may exhibit a cooling effect when such fuels undergo a transition from the liquid phase to a gaseous phase. Even those fuels stored in a gaseous phase (e.g., natural gas) exhibit the cooling effect (i.e., the Joule-Thomson effect) when such gaseous fuels undergo a reduction in pressure. A thermal management system can utilize such cooling effect to facilitate cooling of the air-fuel mixture provided to the engine for effective combustion of the fuel, to reduce the temperature of engine components and exhaust gases when the engine is provided with a stochiometric air-fuel mixture, and to cool non-engine heat-generating components before supplying the fuel to the engine for combustion.

Engine systems have been developed that combust an alternative fuel, e.g., compressed natural gas, to generate power. In some such systems, all the alternative fuel used by the engine is heated using warmed engine coolant in a heat exchange arrangement to a usable temperature before being supplied into an engine fuel intake of the engine by a fuel metering valve. However, such engine systems lack a thermal management system as disclosed herein that uses the above-noted cooling effect induced by a phase transition or a pressure change to selectively cool engine and non-engine heat-generating components in accordance with the cooling requirements of such components.

As described in greater detail below, an engine system of a work vehicle is configured with an engine that combusts an alternative fuel and a thermal management system to control the temperature of the air-fuel mixture and engine and non-engine heat-generating components of the work vehicle. The alternative fuel is stored under pressure in a gaseous or liquid state in a fuel tank coupled to the engine system by a high-pressure fuel line. Unless noted otherwise, the term “fuel” is used in the disclosure that follows to refer to an alternative fuel.

While the engine system is operating, the thermal management system monitors indications of temperature(s) of the fuel in one or more fuel flow line(s) of the engine system, a temperature of ambient air drawn into an intake manifold of the engine, a temperature of the air-fuel mixture being supplied to the engine, a temperature of exhaust generated by the engine, temperature(s) of one or more engine components, and temperature(s) of one or more non-engine component(s). The one or more engine components include, for example, engine intake and exhaust manifolds, one or more piston-cylinder arrangement(s), one or more combustion chamber(s), fuel injector(s), and the like. The non-engine component(s) include, for example, a radiator, an intercooler or charged air cooler, a cabin heating and air conditioning system, a hydraulic component, a transmission, an electrical component, an exhaust gas recirculation system, and the like. The thermal management system uses such temperature indications to determine a desired temperature to supply the fuel to the engine fuel intake of the engine to cool the air-fuel mixture (or a mixture of air, fuel, and recirculated exhaust gases) that results from mixing of such fuel and the drawn ambient air and to cool the engine components for safe and efficient combustion of the fuel. For example, the air-fuel mixture is cooled to a temperature that reduces the risk of abnormal combustion such as pre-ignition or knock that may result in engine damage and/or reduction of power produced by the engine. The thermal management system uses the various temperature indications and the desired fuel temperature to determine a first portion of the fuel drawn from the fuel tank utilized to cool the air-fuel mixture and components of the engine only and a second portion (if any) of the fuel that may be utilized to cool non-engine components before the second portion is supplied to the engine. The first and second portions may be all of the fuel, none of the fuel, or an amount therebetween. For example, the first portion may be none of the fuel and the second portion may be all the fuel if the thermal management system determines that the temperature of the second portion even after drawing heat from the non-engine heat-generating components will be sufficient to cool the engine components and ambient air or a mixture of ambient air and recirculated exhaust gases (“air-exhaust mixture”) supplied to the engine. Similarly, the first portion may be all the fuel and the second portion may be none of the fuel if significant cooling of engine components and/or the ambient air drawn or air-exhaust mixture supplied to the engine is necessary to maintain safe and efficient operation of the engine. The first portion of the fuel is supplied to the engine fuel intake of the engine without being used to cool the non-engine heat-generating components. The second portion of the fuel is utilized to cool the non-engine heat-generating components and then is supplied to the engine fuel intake of the engine. The thermal management system selects the first and second portions to ensure that when such portions are combined at the engine fuel intake, the temperature of the combined fuel is at a temperature sufficient to cool the engine components and the air or air-exhaust mixture discussed above. Further, the thermal management system may operate a heater disposed along a fuel flow line coupled to the engine fuel intake if the thermal management system determines the temperature of the combined first and second portions at the air intake will be less than the desired temperature even after the second portion is heated by drawing heat from one or more of the non-engine heat-generating components. Such a situation may occur, for example, for a period of time after initial ignition of the engine, if the load on the engine is low, the work vehicle is operating in cold ambient conditions, and the like.

The fuel tank supplies fuel to the engine system via a high-pressure fuel line. The high-pressure fuel line is coupled to a plurality of flow lines including an engine fuel supply line and one or more cooling body supply line(s). A throttling valve is disposed between the high-pressure fuel line and the engine fuel supply line. The thermal management system operates the throttling valve to meter a flow rate of the fuel from the high-pressure fuel line into the engine fuel supply line in accordance with the first portion.

For each non-engine heat-generating component, a corresponding cooling body supply line is coupled to the high-pressure fuel line by a thermal expansion valve associated with the non-engine heat-generating component. The thermal management system operates each thermal expansion valve to meter the flow rate from the high-pressure fuel into the cooling body supply line coupled to the thermal expansion valve, through a cooling body (e.g., a heat exchanger) associated with the non-engine heat-generating component, and into the engine fuel supply line. Fuel in a liquid phase that passes through the thermal expansion valve into the cooling body supply line undergoes a change from the liquid phase to a gaseous phase and exhibits the cooling effect discussed above. Similarly, any fuel in a gaseous phase that passes through the thermal expansion valve undergoes a drop in pressure and exhibits the cooling effect.

The fuel passes through the cooling body and draws heat from the cooling body, which in turn draws heat from a working fluid associated with the non-engine heat-generating component flowing through the cooling body or a conductive member of the non-engine heat-generating component that is in with the contact cooling body. Drawing heat in this manner causes cooling of the working fluid or conductive member and thereby cooling of the non-engine heat-generating component. The thermal management system operates the one or more thermal expansion valve(s) to meter flow of fuel from the fuel tank into the one or more cooling body supply lines so that the total flow rate into all of the one or more cooling bodies is in accordance with the second portion determined for cooling the non-engine heat-generating component(s) as discussed above.

The engine fuel supply line is coupled to the engine fuel intake by a fuel intake thermal expansion valve so that any non-gaseous fuel in the engine fuel supply line undergoes a phase change from the liquid phase to the gaseous phase, any gaseous fuel in the engine fuel supply line undergoes a drop in pressure, and the fuel entering the engine fuel intake from the fuel intake expansion valve exhibits the cooling effect induced by such phase and/or pressure change and cools the engine fuel intake of the engine. Thereafter, the fuel supplied to engine fuel intake is injected into one or more combustion chamber(s), mixed with drawn ambient air or an air-exhaust mixture, and ignited to cause the engine to produce power necessary to operate the work vehicle. Injecting the fuel into the combustion chamber(s) causes cooling of such chamber and the piston-cylinder arrangement(s) associated therewith and mixing of the fuel with the ambient air or the air-exhaust mixture causes cooling thereof.

Generally, some alternative fuels have relatively low cetane values compared to petroleum-based fuels. The cetane value of a fuel is a number between 0 and 100 and is an indicator of the propensity of the fuel to autoignite under compression. A fuel with a higher cetane value exhibits a quicker ignition period and therefore requires a lower temperature and pressure for combustion than another fuel having a lower cetane value. The thermal management system described herein mitigates the difficulty of autoigniting a fuel having a low cetane value in a compression ignition engine by preheating such fuel to a desired temperature before the fuel is introduced into a combustion chamber of the engine. Such preheating is accomplished by drawing heat from cooling bodies associated with engine and non-engine heat-generating components into the fuel.

These and further aspects of the disclosed thermal management system will be better understood with regard to the one or more examples described hereinafter.

Example Thermal Management System

Referring to FIG. 1, a work vehicle 10 is shown that can implement embodiments of the disclosure. In the illustrated example, the work vehicle 10 is depicted as an agricultural tractor. It will be understood, however, that other configurations may be possible, including configurations with the work vehicle 10 as a different kind of tractor, a harvester, a log skidder, a grader, or one of various other work vehicle platforms. The work vehicle 10 includes a frame or chassis 12 carried on front and rear wheels 14. Positioned on a forward end region of the chassis 12 is an engine housing 16 within which is located an engine system 18. The engine system 18 provides power via an associated powertrain 20 to an output member (e.g., an output shaft, not shown) that, in turn, transmits power to axle(s) of the work vehicle 10 to provide propulsion thereto and/or to a power take-off shaft for powering an implement on or associated with the work vehicle 10, for example.

Figure 2:
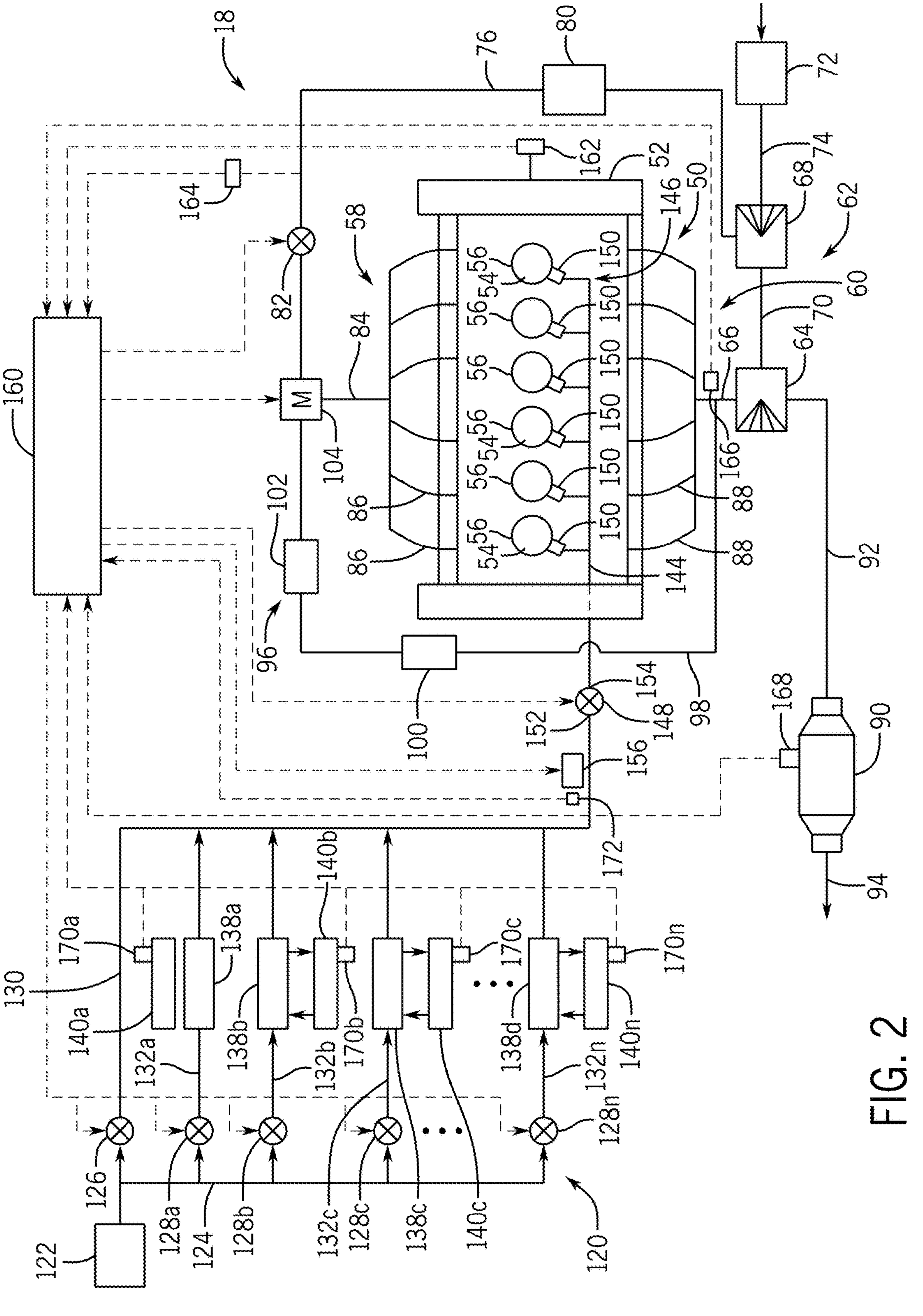
FIG. 2 is a schematic diagram of an example engine system of the work vehicle of FIG. 1.

The engine system 18 is illustrated in greater detail in FIG. 2 in accordance with an example implementation. Referring to FIG. 2, the engine system 18 includes an internal combustion engine 50 (hereafter, "engine") that, in the present embodiment is a spark-ignition internal combustion engine. The engine 50 of the engine system 18 includes an engine block 52 having a plurality of piston-cylinder arrangements 54 disposed in corresponding combustion chambers 56. The plurality of piston-cylinder arrangements 54 operate in response to combustion events in the combustion chambers 56. In the illustrated implementation, the engine 50 is an inline-6 (I-6) engine defining six piston-cylinder arrangements 54; however, in alternative implementations various engine styles and layouts may be used.

The engine system 18 also includes an intake manifold 58 fluidly connected to the engine 50, an exhaust manifold 60 fluidly connected to the engine 50, and a turbocharger assembly 62. The turbocharger assembly 62 includes a turbine 64 fluidly connected to the exhaust manifold 60 by an exhaust gas passageway 66 and a compressor 68 mechanically coupled to the turbine 64 via a rotatable shaft 70. The compressor 68 is fluidly connected to an air intake 72 that may include one or more air intake components (e.g., an air filter, an air cooler, etc.) disposed in an air intake passageway 74. During operation of the engine 50, exhaust gases generated by the engine 50 pass through the exhaust gas passageway 66 and through the turbine 64 to cause the turbine 64 (and the rotatable shaft 70) to rotate. Rotation of the rotatable shaft 70 in turn causes the compressor 68 to rotate and draw fresh air through the air intake 72, through the air intake passageway 74, through the compressor 68, and into the intake manifold 58 via a charge air passageway 76. Operation of the turbocharger assembly 62 in this manner increases the flow rate of air into the intake manifold 58 above what it would otherwise be without the turbocharger assembly 62 and thus the turbocharger assembly 62 supplies so-called "charge" air to the engine 50. In some embodiments, a charge air cooler (i.e., an aftercooler) 80 is disposed in the charge air passageway 76 to cool the charge air. The charge air cooler 80, if present, reduces the temperature of the charge air to increase the unit mass per unit volume (i.e., density) of the charge air prior to such charge air being provided to the engine 50 for improved volumetric efficiency thereof. An air intake throttle 82 is also disposed in the charge air passageway 76 and regulates an amount of charge air supplied to the intake manifold 58. The compressed charged air allowed to flow through the air intake throttle flows through a main intake 84 of the intake manifold 58.

As described below, some embodiments of the engine system 18 do not include a charge air cooler 80 or another cooling device to cool or compress the charge air that flows through the charge air passageway 76. Rather, the charge air is supplied to the intake manifold 58 without cooling/compression and is instead cooled when mixed with fuel in the combustion chamber, which increases the density of such-air-fuel mixture and the volumetric efficiency of the engine 50.

The main intake 84 of the intake manifold 58 is coupled to a plurality of secondary pipes 86 of the intake manifold 58 and each of the secondary pipes 86 is in fluid communication with a corresponding combustion chamber 56 to direct a supply of charge air (compressed or uncompressed) thereto.

The exhaust manifold 60 of the engine system 18 includes a plurality of secondary pipes 88, each of which is in fluid communication with a corresponding combustion chamber 56. The plurality of secondary pipes 88 direct exhaust gases generated by the engine 50 to the exhaust gas passageway 66 of the exhaust manifold 60. As described above, the exhaust gas passageway 66 of the exhaust manifold 60 is fluidly coupled to and causes rotation of the turbine 64 of the turbocharger assembly and thereby causes more ambient air to be drawn into the air intake passageway 74. A first portion of the exhaust gases then exits the turbine 64 and into an aftertreatment system 90 via an aftertreatment passageway 92. The aftertreatment system 90 treats the exhaust gases prior to the treated exhaust gases being vented to the ambient environment via an exhaust outlet 94.

A second portion of the exhaust gases may be directed to an exhaust recirculation (EGR) system 96 that includes an EGR passageway 98, an EGR cooler 100 disposed in the EGR passageway 98, and an EGR pump 102. The EGR pump may be operated to control drawing of the second portion of the exhaust gases from the exhaust gas passageway 66 through EGR passageway 98, through the pump EGR pump 100, and into a mixer 104. The EGR cooler 100 cools the exhaust gases that flow through the EGR passageway 98 before such gases are supplied to the mixer 104. The second portion of gases and the charge air drawn through the air intake passageway 74 combine in the mixer 104 before flowing into the main intake 84 of the intake manifold 58. The EGR system 96 functions to recirculate a portion of the exhaust gases generated by the engine 50 and thereby reduce the formation of oxides of nitrogen (NOx) during combustion.

A fuel supply system 120 provides fuel to the engine system 18 for combustion in the engine 50. The fuel supply system 120 includes a fuel tank 122, a high-pressure fuel line 124, a throttle valve 126, and one or more cooling fuel thermal expansion valves 128*a*, 128*b*, 128*c*, . . . 128*d*. As described in greater detail below, the throttle valve 126 may be operated to allow all or a first portion of the fuel from the high-pressure fuel line 124 to flow into an engine fuel supply line 130. In addition, each cooling fuel thermal expansion valve 128 may be operated to allow a second portion of the fuel from the high-pressure fuel line 124 to flow into a corresponding cooling body supply line 132.

Figure 2A:
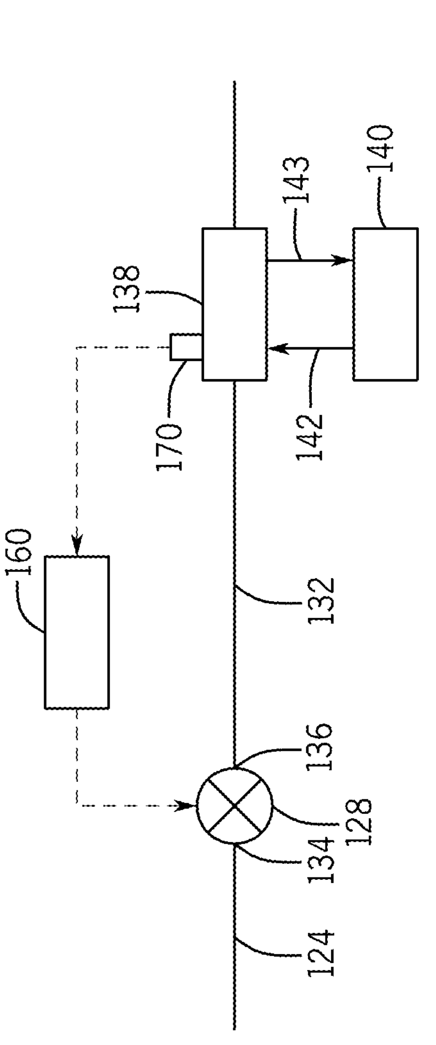
FIGS. 2A and 2B are schematic diagrams of components of the thermal management system of the work vehicle of FIG. 1.
Figure 2B:
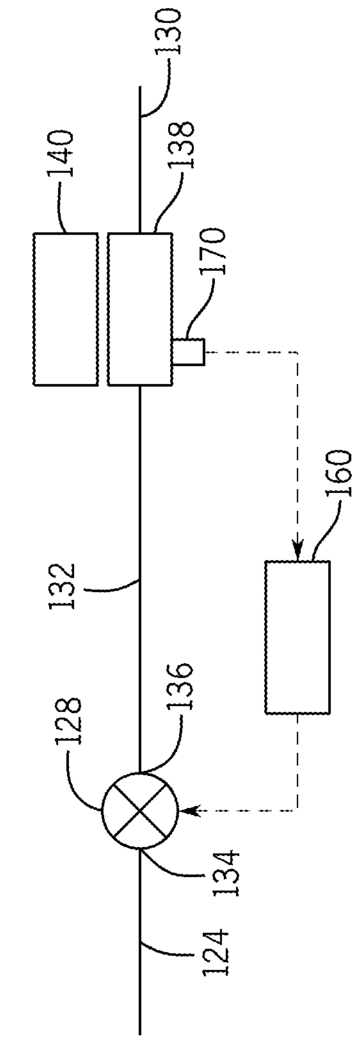

Referring also to FIGS. 2A and 2B, each cooling fuel thermal expansion valve 128 includes an inlet 134 coupled to the high-pressure fuel line 124 and an orifice 136 coupled to the cooling body supply line 132. Fuel that enters the inlet 134 from the high-pressure fuel line 124 and exits the cooling fuel thermal expansion valve 128 via the orifice 136 into the cooling body supply line 132 undergoes a pressure reduction when the fuel enters the cooling body supply line 132. Further, if such fuel is stored in the fuel tank 122 and supplied by the high-pressure fuel line 124 in a liquid state, passage through the cooling fuel thermal expansion valve 128 causes the liquid state fuel to undergo a phase change to a gaseous state as the fuel enters the cooling body supply line 132. Such pressure and phase change causes the fuel that enters the cooling body supply line 132 to exhibit the cooling effect discussed above.

The cooling body supply line 132 passes through a heat exchanger or cooling body 138 and cools such cooling body. In some embodiments, the cooling body, e.g., the cooling bodies 138*b*-138*n* shown in FIG. 2 or the cooling body 138 shown in FIG. 2B, is configured to then draw heat from a working fluid that cools a non-engine heat-generating component 140. In such embodiments, heat is transferred from the non-engine heat-generating component 140 to the working fluid, the working fluid enters the cooling body 138 via a working fluid input line 142, the cooling body 138 cooled by the fuel in the cooling body supply line 132 draws heat from and cools the working fluid as the working fluid passes therethrough, and the cooled working fluid exits the cooling body 138 via a working fluid output line 143. The cooled working fluid then returns to the non-engine heat-generating component 140 via the working fluid output line 143 to draw additional heat from the non-engine heat-generating component 140. In other embodiments, the cooling body, e.g., the cooling body 138*a* shown in FIG. 2 or the cooling body 138 shown in FIG. 2B, having been cooled by the fuel as described above is direct contact with or adjacent to the non-engine heat-generating component 140 and draws heat from the non-engine heat-generating component 140. Fuel in the cooling body supply line 132 that is not in the gaseous phase when entering the cooling body 138 undergoes a transition into the gaseous state as such fuel draws heat from the cooling body 138 and/or the working fluid used to cool the non-engine heat-generating component 140.

The engine fuel supply line 130 is coupled to an engine fuel intake line 144 of an engine fuel intake 146 via an engine fuel thermal expansion valve 148. The engine fuel intake line 144 is coupled to one or more fuel injector(s) 150 that deliver fuel to the one or more combustion chamber(s) 56, respectively. Specifically, the engine fuel supply line 130 is coupled to an inlet 152 of the engine fuel thermal expansion valve 148 and the engine fuel intake line 144 is coupled to an orifice 154 of the engine fuel thermal expansion valve 148. The engine fuel thermal expansion valve 148 is operated to regulate the flow rate of the fuel that enters the inlet 152 from the engine fuel supply line 130, through the engine fuel thermal expansion valve 148, and from the orifice 154 into the engine fuel intake line 144. As discussed above in connection with the cooling fuel thermal expansion valves 128, fuel that passes through the engine fuel thermal expansion valve 148 undergoes a reduction in pressure and any such fuel that is in a liquid state in the engine undergoes a phase change to a gaseous state and thereby exhibits a cooling effect. Such cooling effect cools the fuel injector(s) 150, the combustion chamber(s) 56, and the piston-cylinder arrangement(s) 54 associated with such combustion chamber(s) 56, other components of the engine 50, and components of the engine fuel intake 146.

Fuel supplied to each combustion chamber 56 in this manner cools and mixes with charge air, ambient air, or an air-exhaust mixture supplied to the combustion chamber 56 by the intake manifold 58, is ignited by a spark system (not shown), and is thus combusted to cause the engine 50 to operate and generate power.

The engine system 18 includes a heater 156 configured to supply thermal energy to the fuel in the engine fuel supply line 130 proximate the inlet 152 of the engine fuel thermal expansion valve 148. In some cases, the temperature of the fuel in the engine fuel supply line 130 proximate such inlet 152 and/or the temperature of the engine fuel intake 146 may be so low that further cooling of the fuel induced by passage through the engine fuel thermal expansion valve 148 would impede proper combustion of the fuel in the combustion chambers 56 and/or safe and efficient operation of the engine 50. In such cases, the heater 156 may be operated to supply thermal energy to the fuel prior to passage of such fuel through the engine fuel thermal expansion valve 148 to facilitate proper combustion thereof and/or safe and efficient operation of the engine 50.

Figure 3:
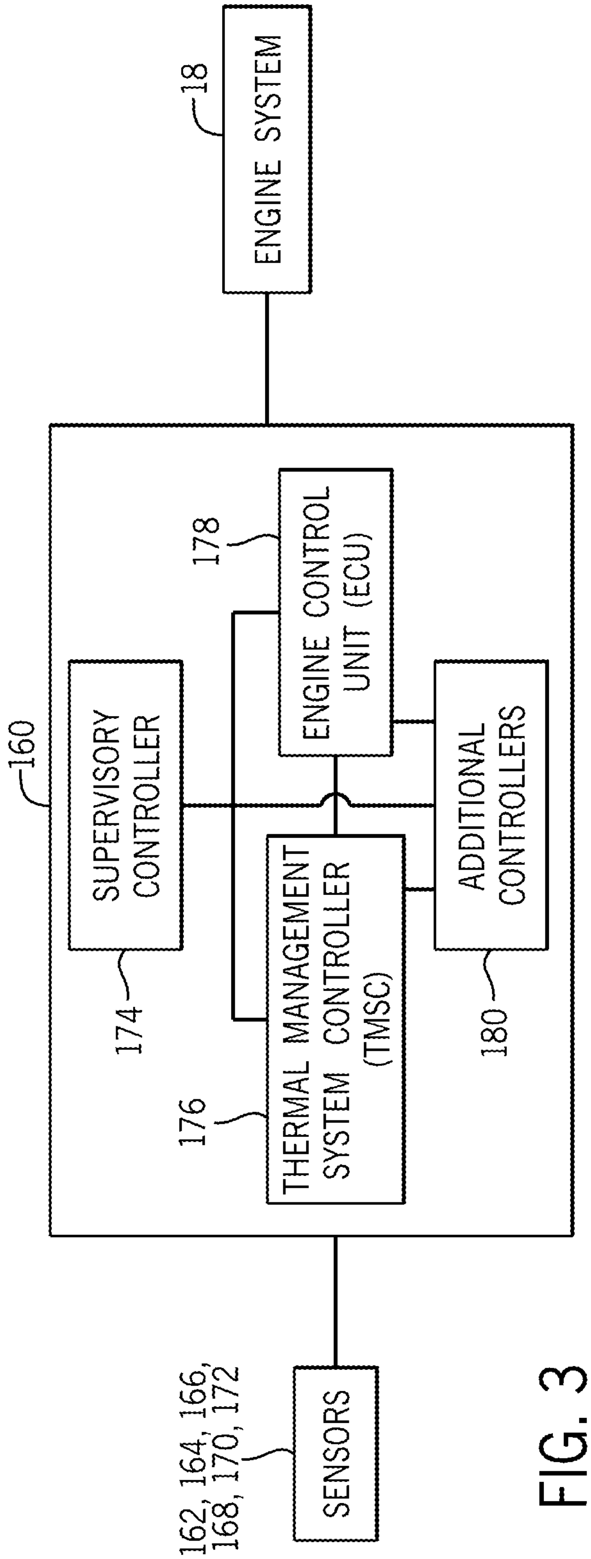
FIG. 3 is a block diagram of a control system of the engine system of FIG. 2.

Referring to FIGS. 2, 2A, and 3, the engine system 18 includes a control system 160 and various sensors including: engine operation sensors 162 that measure operating conditions of the engine including a speed of the engine 50, a temperature of components of the engine 50, and the like; one or more sensor(s) 164 disposed in the intake manifold 58 or the air intake passageway 74 that measure one or more of mass airflow, air temperature, and air pressure in the intake manifold 58 and/or air intake passageway 74; one or more sensor(s) 166 in the exhaust manifold 60 that May measure any or all of an oxygen level, temperature, and pressure of exhaust generated by the engine 50; an aftertreatment temperature sensor 168 that produces a signal and/or data in accordance with a temperature of the aftertreatment system 90; one or more cooling body temperature sensors 170*a*, 170*b*, 170*c*, . . . 170*n* that produces a signal and/or data in accordance with temperatures of the one or more cooling bodies 138*a*, 138*b*, 138*c*, . . . 138*n*, respectively, or the non-engine heat-generating components 140*a*, 140*b*, 140*c*, . . . 140*n* associated with such cooling bodies; and one or more engine fuel supply line sensor(s) 172 that develop(s) a signal and/or data in accordance with a temperature and pressure of fuel in the engine fuel supply line 130 proximate the inlet 152 of the engine fuel thermal expansion valve 148.

The control system 160 monitors signals or data received from the sensors 162, 164, 166, 168, 170, and 172 described above and adjusts operation of the engine system 18 as described herein. The control system 160 includes a supervisory controller 174; a thermal management system controller (TMSC) 176 for thermal management of the fuel, the components of engine 50, the cooling bodies 138, and the non-engine heat-generating components 140 of the work vehicle 10; and an engine control unit (ECU) 178 that optimizes operation of the engine 50. The control system 160 may also include one or more additional controller(s) 180 such as an operator interface controller, a climate control system, a traction system controller, an accessory and/or hydraulic system controller, a work implement controller, and various others.

The supervisory controller 174 initiates the TMSC 176, the ECU 178, and the additional controllers 180 when the work vehicle 10 is started by the operator (e.g., when the operator of the work vehicle 10 actuates an ignition of the work vehicle 10), monitors operation of such controllers 176, 178, and 180 during operation of the work vehicle 10, and shuts down such controllers 176, 178, and 180 when the operator turns off work vehicle 10. The supervisory controller 174, the TMSC 176, the ECU 178, and the additional controllers 180 exchange signals and/or data therebetween as necessary to maintain efficient and clean operation of the engine system 18 (and thereby the work vehicle 10).

Figure 3A:
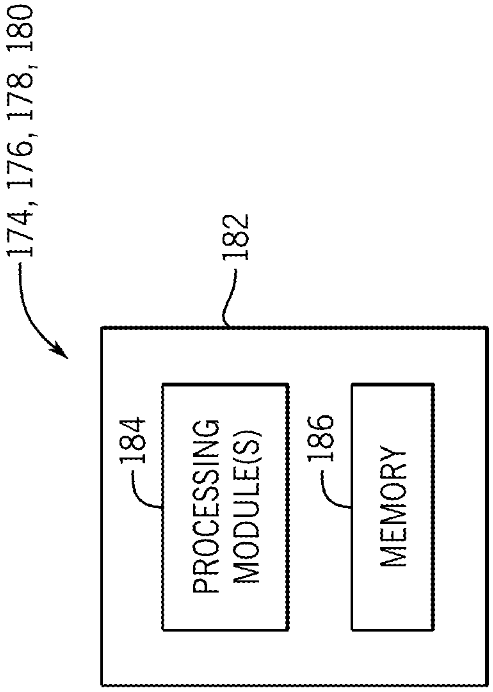
FIG. 3A is a block diagram of a computer-based device that may implement the components of the control system of FIG. 3.

Referring also to FIG. 3A, the supervisory controller 174, the TMSC 176, the ECU 178, and the additional controllers 180 may be implemented using hardware, software, firmware, or combinations thereof. In the illustrated embodiment, such controllers 174, 176, 178, and 180 of the control system 160 may be implemented by one or more suitably programmed computer-based device(s) 182, some or each having a processing device 184 and a memory device 186. The memory device 186 has stored therein, among other things, programming instructions executed by one or more processing devices 184 to cause the controllers 174, 176, 178, and 180 to undertake functions of the engine system 18 as described herein.

Each computer-based device 184 may comprise, e.g., a computer, a device using one or more application specific integrated circuits (ASIC's) and/or field-programmable gate arrays (FPGA's), and/or combinations thereof. Such device 184 may be unitary or may be distributed multiple computing devices, and one or more such computing devices may be installed locally on or remote from the work vehicle 10. Each computer-based device 184 may communicate with another computing device over one or more network(s) such as a local area network (LAN), a control area network (CAN), a cellular network, a wide area network (WAN) such as the Internet, and the like. One or more controllers 174, 176, 178, and 180 of the control system 160 also may be coupled to and responsive to one or more user device(s) (not shown) such as a keyboard, a mouse, a display, a touchscreen, a joystick, etc. (not shown) via which an operator may monitor and direct operation of the work vehicle 10.

When the work vehicle 10 is initially turned on by the operator, the control system 160 directs the TMSC 176 to operate the throttle valve 126 and the engine fuel thermal expansion valve 148 to begin delivery of fuel from the fuel tank 122, through the high-pressure fuel line 124, through the throttle valve 126, through the engine fuel supply line 130, through the engine fuel thermal expansion valve 148, and into the engine fuel intake 146 of the engine 50. In addition, the control system 160 directs the ECU 178 to operate the fuel injectors 150 to direct fuel, the air intake throttle 82 to deliver ambient air or charge air into the combustion chamber(s) 56, and the spark system (not shown) to ignite the fuel. As the engine 50 operates, the TMSC 176 monitors signals and/or data generated by the sensors 162, 166, 170, and 172 to determine the temperatures of the components of the engine 50, the temperature of exhaust generated by the engine 50, temperatures of non-engine heat-generating components 140 of the work vehicle 10, and the fuel in the engine fuel supply line 130, respectively. In response, the TMSC 176 operates the throttle valve 126 and/or one or more of the cooling fuel thermal expansion valves 128 to allow all, a portion, or none of the fuel from the high-pressure fuel line 124 directly into the engine fuel supply line 130 without such fuel passing through any of the cooling bodies 138. In addition, the TMSC 176 causes a remaining portion of the fuel (if any) to be directed through the one or more of the cooling fuel thermal expansion valves 128 to be utilized to cool the cooling bodies 138 and thereby the non-engine heat-generating components 140 associated with such cooling bodies before being supplied to the engine fuel supply line 130. The TMSC 176 also actuates the heater 156 if the temperature of the fuel in the engine fuel supply line 130 proximate the engine fuel thermal expansion valve 148 is too low to be supplied to the engine fuel intake 146 of the engine 50 for safe and efficient operation thereof. The TMSC 176 and the ECU 178 continue to operate in this manner until directed by the supervisory controller 174 to terminate operation of the engine 50.

In some embodiments, the fuel supplied through the throttle valve 126 into the engine fuel supply line 130 does not undergo a phase change as such fuel passes through the throttle valve 126. Thus, in such embodiments, the fuel remains in the liquid phase after passing through the throttle valve 126 into the fuel supply line 130 if the fuel is stored in the fuel tank 122 in a liquid phase. Similarly, the fuel remains in a gaseous phase when supplied into the fuel supply line 130 if such fuel is stored in the fuel tank 122 in a gaseous phase.

Figure 4:
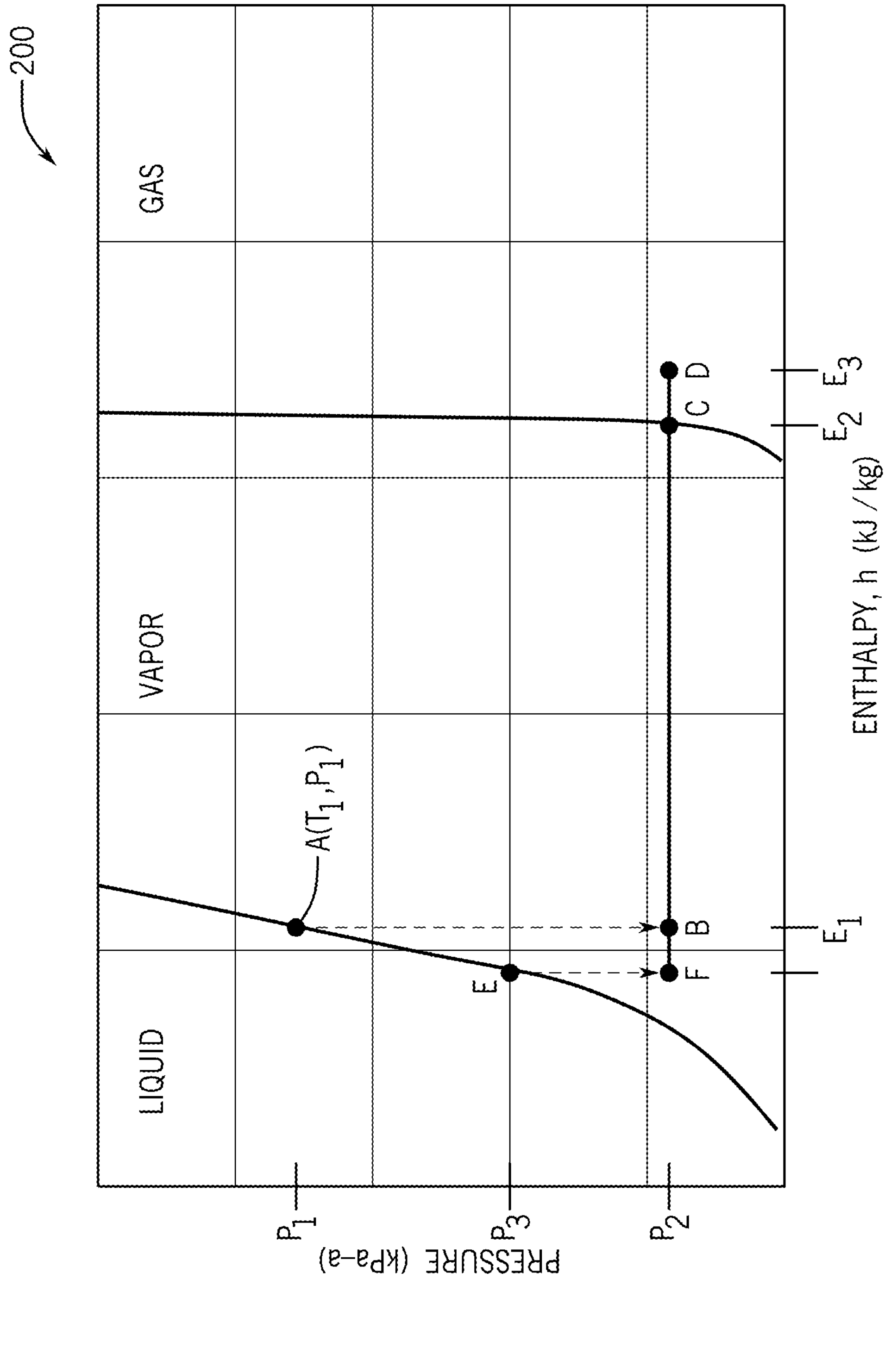
FIG. 4 is a pressure-enthalpy diagram of a fuel that may be combusted by an engine of the engine system of FIG. 2.

FIG. 4 is a pressure-enthalpy diagram 200 of a fuel that is supplied from the fuel tank 122 via the high-pressure fuel line 124 in the liquid phase. At point A, the fuel is at a temperature $T_1$ and pressure $P_1$. From point A to point B, the fuel passes through the cooling fuel thermal expansion valve 128 and undergoes a reduction in pressure and temperature to a temperature $T_2$ and a pressure $P_2$ and begins to vaporize. Between points B and C, the fuel flows through the cooling body supply line 132 and the cooling body 138 and continues to vaporize. Between points B and C, the ratio of fuel in the gas phase versus in the liquid phase increases and thereby the enthalpy of the fuel increases from $E_1$ to $E_2$. Such change in enthalpy allows the fuel to absorb heat from the cooling body 138. At point C the fuel has fully vaporized and is in a completely gaseous state. Additional heat (e.g., by the heater 156) may be added to the fuel between points C and D to increase the temperature of the fuel to a temperature necessary for proper combustion, if necessary, which also increases the enthalpy of the fuel to $E_3$. In some cases, the fuel may be supplied through the high-pressure fuel line 124 at a temperature $T_3$ and a pressure $P_3$ associated with point E. As the fuel passes through the cooling fuel thermal expansion valve 128, the pressure and temperature initially drop to point F at which the pressure and temperature of the fuel are $P_2$ and $T_4$, respectively. Between point F and point C, the enthalpy of the fuel increases from $E_4$ to $E_2$ as fuel transitions from a vapor state to the fully gaseous state, as described above. In some embodiments, the fuel is ammonia and the temperatures $T_1$ and $T_2$ are approximately 45° Celsius and 0° Celsius, respectively. The pressures $P_1$, $P_2$, and $P_3$ are approximately 1,700 kPa-a, approximately 480 kPa-a, and approximately 1,000 kPa-a, respectively. The enthalpies $E_1$, $E_2$, $E_3$, and $E_4$ are approximately 480 kJ/kg, 510 kJ/kg, 1,600 kJ/kg, and 1,750 kJ/kg, respectively. A similar change in temperature, pressure, and enthalpy occurs as liquid fuel in the engine fuel supply line 130 passes through the engine fuel thermal expansion valve 148. Further, for fuel that is ammonia at pressure states and enthalpies noted in the foregoing, the temperatures of the fuel vapor associated with points C, D, E, and F are 0°, 50°, 25°, and 0° Celsius, respectively. The temperature of the fuel at point D is selectable by the TMSC 176 to supply the engine 50 with a temperature suitable for combustion.

Figure 5:
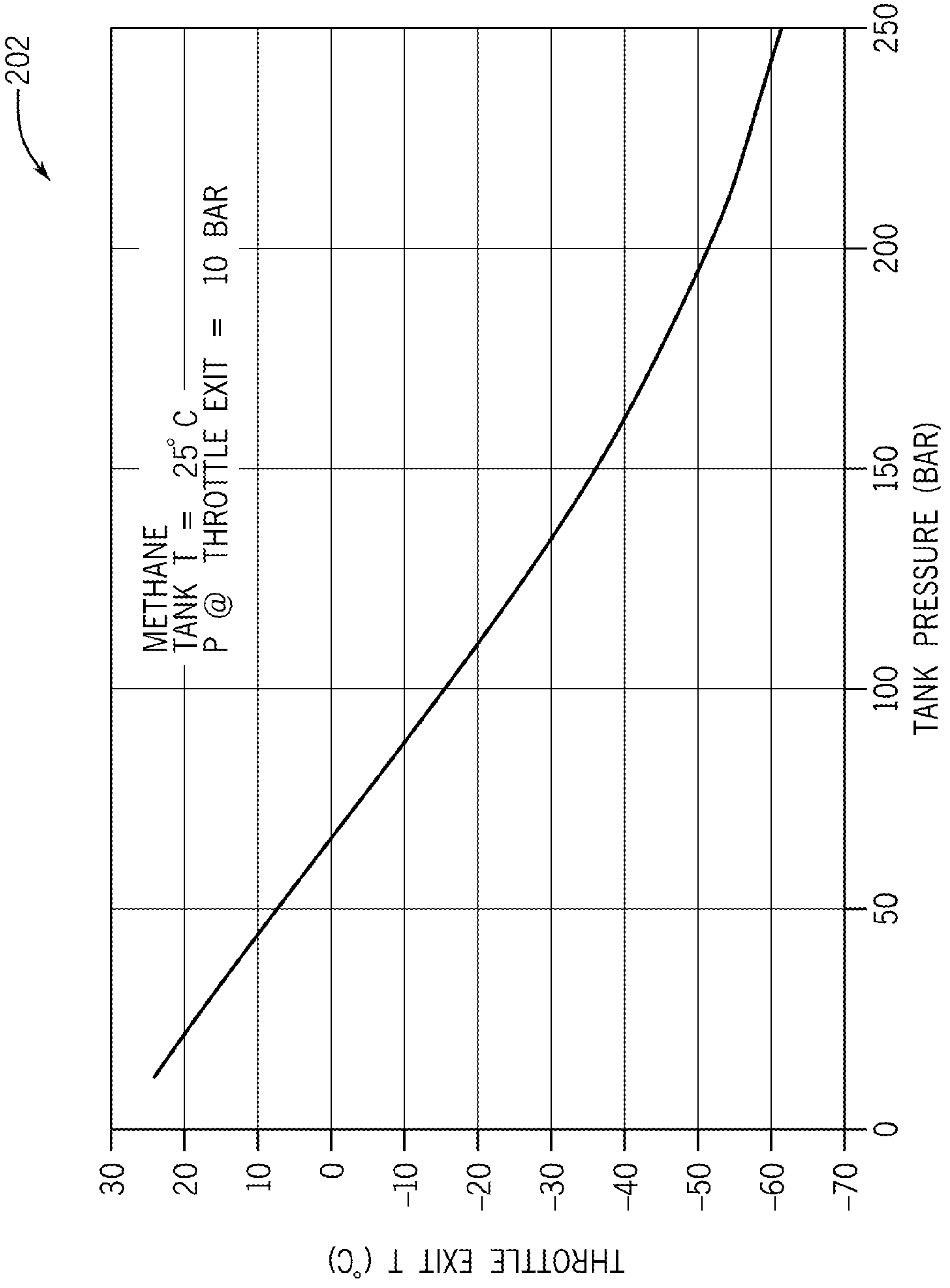
FIG. 5 is a pressure-temperature diagram of a fuel that may be combusted by the engine of the engine system of FIG. 2.

In some embodiments, fuel is stored in the fuel tank 122 in a gaseous phase and enters the cooling fuel thermal expansion valve 128 or engine fuel thermal expansion valve 148 in the gaseous state. Alternately, fuel that has passed through the cooling body 138 may be in the gaseous phase when such fuel enters the engine fuel supply line 130. When such gaseous fuel from the fuel tank 122 passes through the cooling fuel thermal expansion valve 128 and/or gaseous fuel in the engine fuel supply line 130 passes through the engine fuel thermal expansion valve 148, the gaseous fuel undergoes a pressure change that induces a cooling effect. The cooling effect depends on the temperature of the fuel and the change in pressure. FIG. 5 is a chart 202 that illustrates a relationship between the pressure of the fuel in the fuel tank 122 and the drop in temperature induced in methane. If the fuel is stored in the fuel tank 122 at 200 bar and 25° Celsius and the pressure of the fuel in the cooling body supply line 132 is 10 bar, the temperature of the fuel drops by approximately 75° Celsius to −50° Celsius as the fuel passes through the cooling fuel thermal expansion valve 128 or the engine fuel thermal expansion valve 148. Such cooling of the fuel may be used to cool the working fluid passing through the cooling body 138 and/or the engine fuel intake 146.

In a conventional diesel engine, approximately 41% of the fuel energy may be used for operation of the work vehicle 10. Typically, approximately 30% of the fuel energy that results from operation of the engine may need to be drawn away to allow efficient and safe operation thereof. Of the 30%, approximately 10% is drawn away from the charge air in the air intake passageway 74 by the charge air cooler 80, 17% from engine components by circulation of glycol through the engine components and a radiator system, and 3% from recirculated exhaust gases provided to the engine by circulation of the glycol through the EGR cooler 100 of the EGR system 96. Gasoline engines may be less efficient and may require a large amount of heat to be drawn away for safe operation thereof.

Table 2 below shows the capacity of different fuels to reduce the temperature of the ambient air supplied to engine 50 via the intake manifold 58. The air-cooling capacity shown in Table 2 is based on an air mass flow of 1,261 kilograms per hour and supplying a stochiometric ratio of air and fuel.

TABLE 2

| | Stochiometric Air-Fuel Ratio | Fuel Mass Flow (Kg/h) | Fuel Cooling Capacity (kW) | Reduction in Air Temperature (Degrees ° C.) |
|---|---|---|---|---|
| Liquified Petroleum Gas | 15.7 | 80 | 10 | 27 |
| Ethanol (100%) | 9 | 140 | 35 | 99 |
| Methanol | 6.5 | 210 | 80 | 177 |
| Ammonia | 6 | 210 | 890 | 226 |
| Compressed Natural Gas | 16 | 126 | 8 | 15 |

As, shown in Table 2, the air-cooling capacity induced in certain fuels (e.g., methanol and ammonia) when such fuel passes through the engine fuel thermal expansion valve 148 and is supplied to the engine fuel intake 146 of the engine 50 may be sufficient to provide some or all the cooling requirements of components of the engine 50, the air drawn through the air intake passageway 74, and/or the exhaust gases recirculated through the EGR system 96. Such cooling capacity, in some embodiments, allows elimination the use of other devices (e.g., the charge air cooler 80 or an intercooler) to cool air drawn through the air intake passageway 74 and supplied to the air intake 72.

Further, as cooled fuel from the engine fuel thermal expansion valve 148 mixes with air or an air-exhaust mixture in the combustion chamber 56, such mixture becomes denser and enables a higher power density of the engine. Further, in some cases, the cooler air-fuel (or air-fuel-exhaust) mixture may also increase the potential for improved engine efficiency before the onset of preignition or engine knock.

Figure 6:
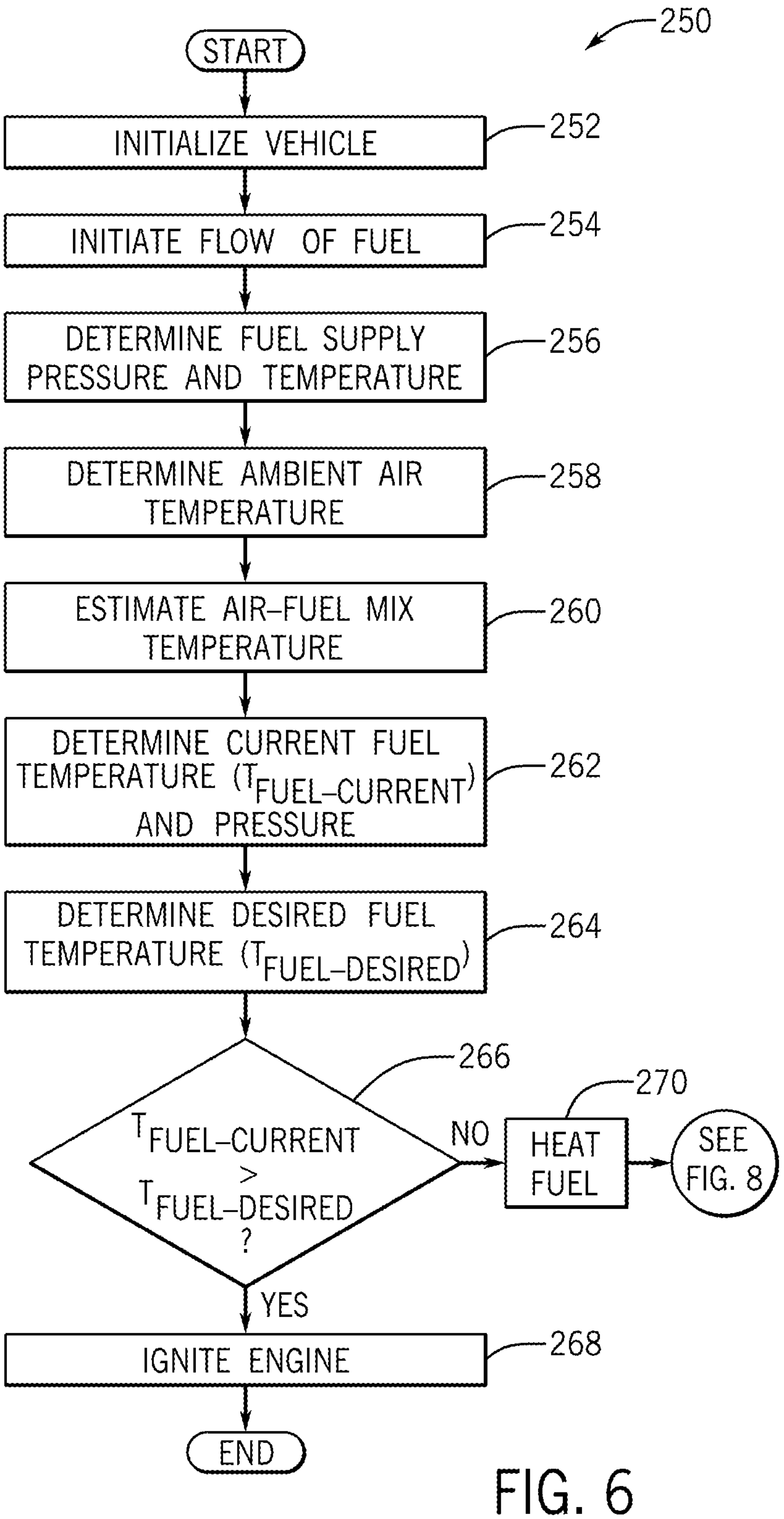
FIG. 6 is a flowchart of steps undertaken by a thermal management system of the engine system of FIG. 2 in preparation for ignition of the engine thereof.

FIG. 6 is a flowchart 250 that illustrates steps undertaken by the control system 160 in preparation for ignition of the engine 50. Referring to FIGS. 1-3 and 6, at step 252, the supervisory controller 174 detects the operator has turned on the work vehicle 10 and initializes various systems of the work vehicle 10 including the TMSC 176, the ECU 178, the additional controllers 180, and the sensors 162-172 and directs the TMSC 176 to prepare the fuel from the fuel tank 122 for combustion. Thereafter, at step 254, the TMSC 176 operates the engine fuel thermal expansion valve 148 and operates the throttle valve 126 to initiate flow of the fuel from the high-pressure fuel line 124, through the engine fuel supply line 130, into the inlet 152 of the engine fuel thermal expansion valve 148, out of the orifice 154 of the engine fuel thermal expansion valve 148, and into the engine fuel intake 146 of the engine 50.

At step 256, the TMSC 176 determines a temperature and pressure of the fuel in the engine fuel supply line 130 in accordance with one or more signal(s) and/or data developed by the one or more engine fuel supply line sensor(s) 172. At step 258, the TMSC 176 determines a temperature and/or humidity of the ambient air in accordance with one or more signal(s) and/or data developed by the sensors 164 disposed in the air intake passageway 74. At step 260, the TMSC 176 develops an estimate of a temperature of the air-fuel mixture that should be used for optimal ignition of the engine 50, for example, in accordance with the octane rating or other qualities of the fuel being used, humidity and/or temperature of the ambient air with which the fuel will be mixed, and the like. At step 262, the TMSC 176 uses data and/or signals developed by the engine fuel supply line sensor(s) 172 to determine a temperature and pressure of the fuel in the engine fuel supply line 130 and sets a value $T_{fuel\text{-}current}$ that represents a current temperature of the fuel in the engine fuel supply line 130 proximate the inlet 152. At step 264, the TMSC 176 uses the temperature and pressure of the fuel in the engine fuel supply line 130, expected cooling of the fuel as the fuel passes through from the inlet 152 and out of the orifice 154 of the engine fuel thermal expansion valve 148, the ambient air temperature, and the desired air-fuel ratio for ignition based on the type of fuel being used to estimate a value $T_{fuel\text{-}desired}$ that represents a temperature of the fuel in the engine fuel supply line 130 at the inlet 152 that will result in an air-fuel mixture in the combustion chambers 56 having a temperature optimal for ignition of the engine 50, as determined at step 260.

At step 266, the TMSC 176 checks if the value $T_{fuel\text{-}current}$ is greater than the value $T_{fuel\text{-}desired}$, i.e., the temperature of the fuel in the engine fuel supply line 130 is sufficient to produce an air-fuel mixture having a temperature that is at least the temperature estimated at step 260, and if so, at step 268, directs the ECU 178 to ignite the engine 50. Otherwise, at step 270, the TMSC 176 heats the fuel at step 270 as described in greater detail below, and proceeds to step 268 described above.

Figure 7:
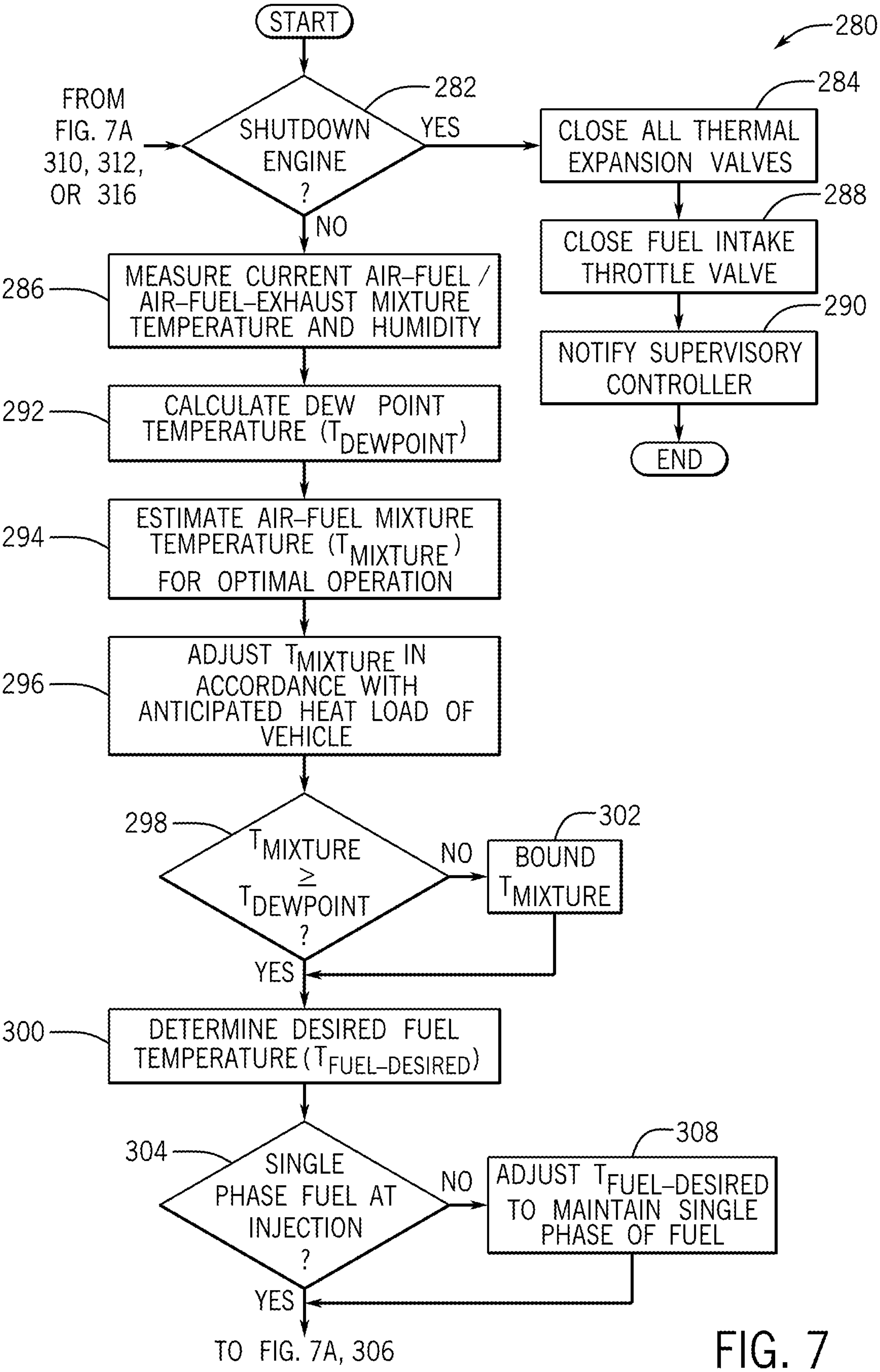
FIGS. 7 and 7A are flowcharts of steps undertaken by the thermal management system of the engine system of FIG. 2 while the engine thereof is operating.

FIG. 7 is a flowchart 280 of the steps undertaken by the TMSC 176 while the engine 50 is operating. Referring to FIG. 7, at step 282, the TMSC 176 determines if a signal and/or data has been provided by the supervisory controller 174 that operation of the engine 50 is to be terminated and if so the TMSC 176 proceeds to step 284. Otherwise, the TMSC 176 proceeds to step 286.

At step 284, the TMSC 176 operates the cooling fuel thermal expansion valves 128 and the engine fuel thermal expansion valve 148 to stop the flow of fuel into the engine fuel intake 146 and, at step 288, operates the throttle valve 126 to stop the flow of fuel into the engine fuel supply line 130. Thereafter, at step 290, the TMSC 176 provides a signal and/or data to the supervisory controller 174 that supply of fuel to the engine system 18 has been terminated and exits.

If at step 282 the TMSC 176 determines that no signal or data has been provided that operation of the engine 50 is to be terminated, the TMSC 176 determines a temperature and humidity of the air-fuel or air-fuel-exhaust mixture provided to the combustion chambers 56 using data and/or signal developed by the one or more sensors 164 disposed in the intake manifold 58 and/or air intake passageway 74. At step 292, the TMSC 176 calculates a value $T_{dewpoint}$ in accordance with the temperature and humidity determined at step 286 that represents a dewpoint temperature of such mixture (i.e., a temperature at which at least a portion of one or more components of such mixture may transition from a gaseous state to a liquid state). At step 294, the TMSC 176 determines a value $T_{mixture}$ that represents a temperature of the air-fuel or air-fuel-exhaust mixture that should be used for optimal operation of the engine 50 based on the current temperature and humidity determined at step 286, the temperature of the ambient air, a temperature of exhaust gases being generated, qualities of the fuel being used, and the like. At step 296, the TMSC 176 determines an anticipated heat load of the engine 50 in accordance with power demands on the engine 50 and adjusts the value $T_{mixture}$ so that the engine 50 will generate sufficient power to meet such demands. Such anticipated heat load may be estimated, for example, using information supplied by the ECU 178 regarding one or more of fuel flow to the engine 50, air flow to the engine 50, and flow of recirculated exhaust gases to the engine and the like. In addition, the TMSC 176 may adjust the value $T_{mixture}$ in accordance with cooling needs of engine and non-engine components in accordance with target temperatures associated with coolant used to draw heat from the engine 80, temperature of the charge air at an outlet the charge air cooler 80, temperature of the recirculated gases at an outlet of the EGR cooler 100, and the like.

At step 298, the TMSC 176 determines if the value $T_{mixture}$ is at least the value $T_{dewpoint}$ and if so proceeds to step 300. Otherwise, the TMSC 176 sets the value $T_{mixture}$ to be identical to the value $T_{dewpoint}$ or, in some embodiments, a value that greater than the value $T_{dewpoint}$ by a predetermined amount and then proceeds to step 300. At step 300, the TMSC 176 determines a value $T_{fuel\text{-}desired}$ that represents a temperature of the fuel in the engine fuel supply line 130 at the inlet 152 of the engine fuel thermal expansion valve 148 that will result in an air-fuel or air-fuel-exhaust mixture having a temperature $T_{mixture}$.

Figure 7A:
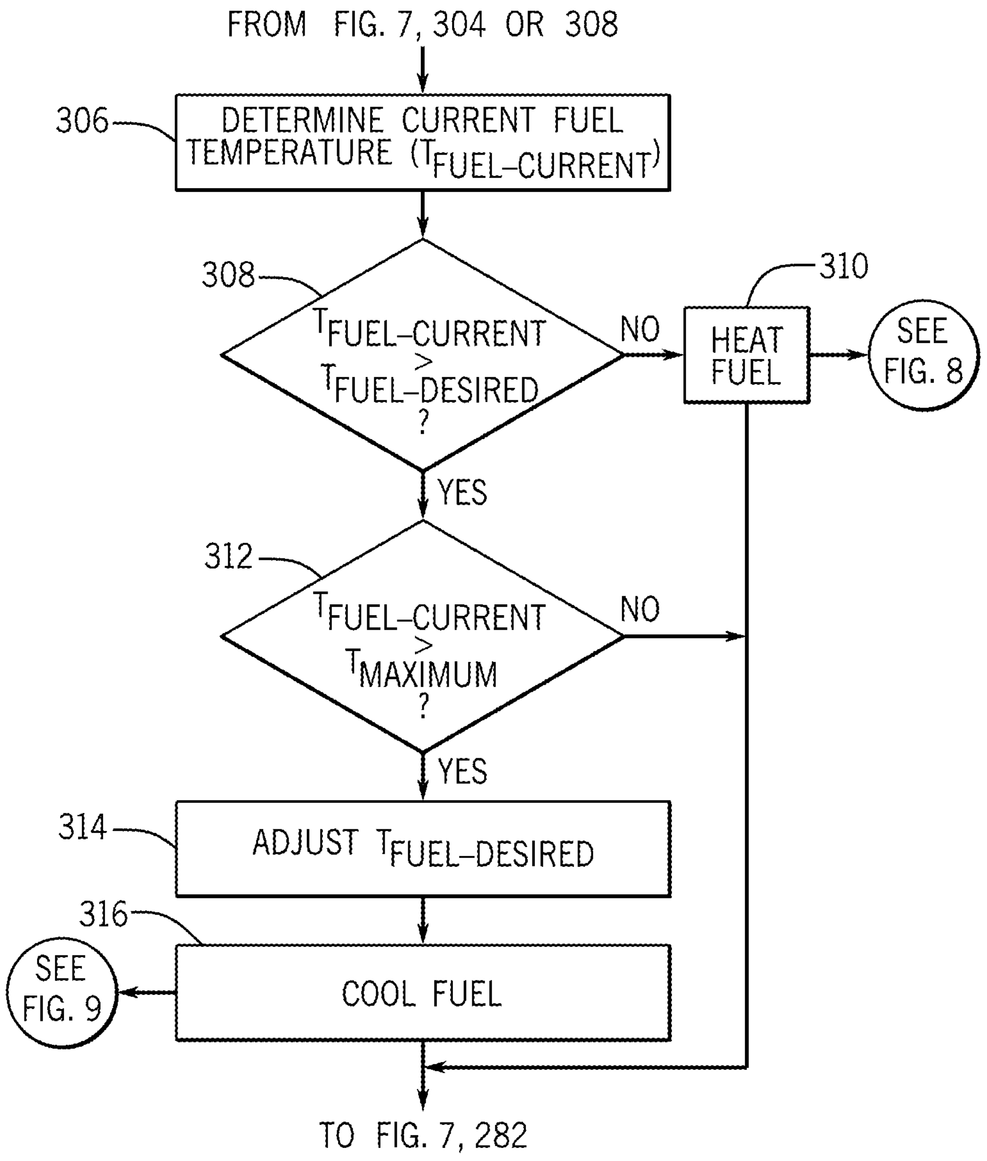

At step 304, the TMSC 176 determines if the fuel injected by the fuel injectors 150 into the combustion chambers 56 is in a single phase (i.e., such fuel is either fully gaseous or fully liquid) and if so proceeds to step 306 (FIG. 7A). Otherwise, the TMSC adjusts the value $T_{fuel\text{-}desired}$ to be a temperature of the fuel at the inlet 152 that results in a single-phase fuel being injected into the combustion chamber(s) 56 at step and then proceeds to step 306 (FIG. 7A). The TMSC 176 may use saturation properties (e.g., as shown in the curves in FIG. 4) of the fuel, temperature, and pressure data developed by the engine fuel supply line sensor 172, the intake manifold sensor(s) 164, and the like to determine if the fuel injected is in a single phase. In some embodiments, the TMSC 176 determines the phase of the fuel that is to be injected in accordance with the type of fuel being used, properties of the fuel injectors 150, operating conditions of the engine 50, and the like. For example, in some cases, the TMSC 176 may supply the fuel in a gaseous phase when the engine is first ignited for improved starting capability and then supply fuel in a liquid phase when the engine is under high load or operated in a hot environment to facilitate cooling of the combustion chamber.

At step 306, the TMSC 176 determines a value $T_{fuel\text{-}current}$ that represents a current temperature of the fuel in the engine fuel supply line 130 at the inlet 152. The TMSC 176 then determines if the value $T_{fuel\text{-}current}$ is greater than the value $T_{fuel\text{-}desired}$ at step 308 and if so proceeds to step 312. Otherwise, at step 310, the TMSC 176 causes heating of the fuel as described in greater detail below and then returns to step 282 (FIG. 7).

At step 312, the TMSC 176 determines if the value of the $T_{fuel\text{-}current}$ exceeds a predetermined value $T_{maximum}$. The value $T_{maximum}$ represents a temperature of the fuel at which the excess thermal energy in the fuel may interfere with safe operation of the engine 50, for example, by not providing sufficient cooling of the ambient air and/or air-exhaust mixture to avoid thermal damage to components of the engine 50, increasing the risk of pre-combustion that may reduce power generated by the engine 50, and the like. If at step 312, the TMSC 176 determines the temperature $T_{fuel\text{-}current}$ does not exceed the value $T_{maximum}$, the TMSC 176 returns to step 282 (FIG. 7). Otherwise, the TMSC 176 adjusts the value $T_{fuel\text{-}desired}$ to be a value that is identical to or a predetermined amount less than the value $T_{maximum}$ at step 314, the TMSC 176 cools the fuel at step 316 as described in greater detail below and returns to step 282 (FIG. 7).

It should be apparent to one who has ordinary skill in the art that the TMSC 176 may wait a predetermined period of time between step 310 (FIG. 7A) or step 316 (FIG. 7A) and step 282 (FIG. 7) so that the effects of heating or cooling the fuel at step 310 or step 316, respectively, are reflected in the current fuel temperature ($T_{fuel\text{-}current}$).

Figure 8:
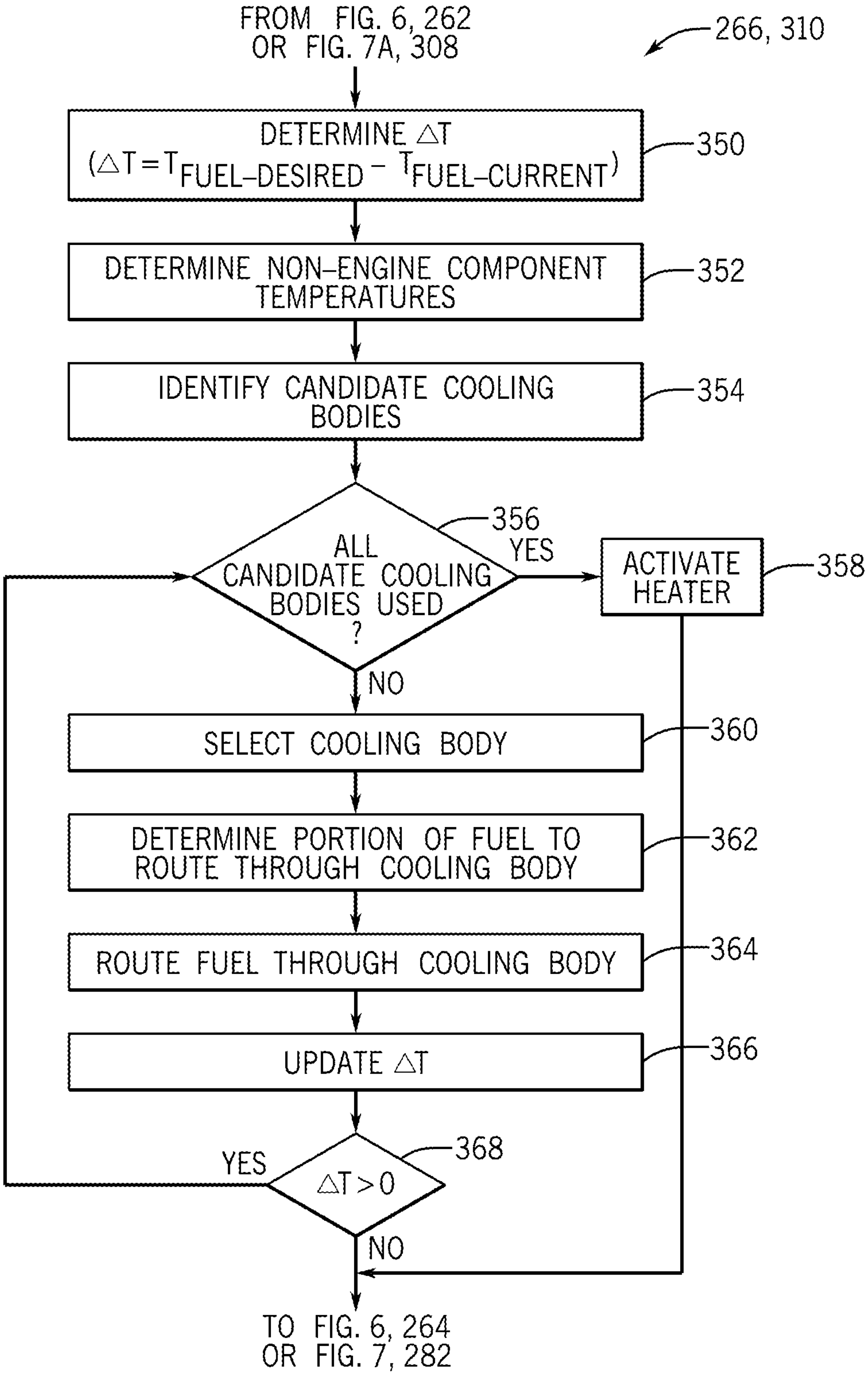
FIG. 8 is a flowchart of steps undertaken by the thermal management system of the engine system of FIG. 2 to heat fuel supplied to the engine thereof.

FIG. 8 is a flowchart that illustrates steps undertaken by the TMSC 176 at step 266 of FIG. 6 or step 310 of FIG. 7 to raise the temperature of the fuel in the engine fuel supply line 130 at the inlet 152 of the engine fuel thermal expansion valve 148.

At step 350, the TMSC 176 determines a value ΔT that represents an amount the temperature of the fuel in the engine fuel supply line 130 needs to be raised.

At step 352, the TMSC 176 uses a signal and/or data developed by each non-engine heat-generating component temperature sensor 170 to determine a temperature of the non-engine heat-generating component 140 associated with such sensor 170. In some embodiments, the temperature sensor 170 may provide an indication of the temperature of the cooling body 138 associated with the non-engine heat-generating component 140 and the TMSC 176 uses such temperature.

At step 354, the TMSC 176 identifies each candidate cooling body (if any) 138 associated with a non-engine heat-generating component 140 that has a temperature sufficiently high that such cooling body 138 could supply thermal energy to the fuel to raise the temperature of the fuel in the engine fuel supply line 130. At step 356, the TMSC 176 determines if all of the candidate cooling bodies 138 are in the fuel path between the high-pressure fuel line 124 and the engine fuel supply line 130 and the flow of fuel through such candidate cooling bodies is at a maximum. If so, the TMSC proceeds to step 358, otherwise, the TMSC 176 proceeds to step 360.

At step 358, the TMSC 176 activates the heater 156 to heat the fuel. In some embodiments, the heater 156 may be operated at a fixed temperature and the TMSC 176 turns on the heater 156. In other embodiments, the heater 156 may have variable temperature settings and the TMSC 176 turns on and selects a temperature setting in accordance with the value ΔT. Thereafter, the TMSC 176 returns to step 264 (FIG. 6) or step 282 (FIG. 7).

At step 360, the TMSC 176 selects a candidate cooling body 138 that is not already in the fuel path between the high-pressure fuel line 124 and the engine fuel supply line 130 or a cooling body 138 that is in such path but the flow of fuel through such cooling body is not at a maximum. In some embodiments, the TMSC 176 selects candidate cooling body 138 in accordance with a temperature of the non-engine heat-generating component 140 associated therewith. For example, the TMSC 176 may select the candidate cooling body 138 that is associated with the non-engine heat-generating component 140 that has the highest temperature or has a temperature furthest from a predetermined optimal temperature associated with the non-engine heat-generating component 140 before another cooling body 138. In other embodiments, a candidate cooling body 138 associated with a non-engine heat-generating component 140 that is more susceptible to damage from excess heat May be selected before other candidate cooling bodies 138. So, for example, the candidate cooling body 138 associated with the electrical system of the vehicle may be selected at step 360 before the candidate cooling body 138 associated with a cabin air conditioning system.

At step 362, the TMSC 176 determines what portion of the fuel from the high-pressure fuel line 124 should be routed through the candidate cooling body 138 selected at step 360. In particular, the TMSC 176 determines such portion in accordance with the value ΔT and the temperature of the non-engine heat-generating component 140 associated with the selected candidate cooling body 138 determined at step 352.

At step 364, the TMSC 176 operates the throttle valve 126 and the cooling fuel thermal expansion valve 128 associated with the selected candidate cooling body 138 in accordance with the portion determined at step 362. In particular, the TMSC 176 operates the throttle valve 126 to reduce a flow rate of fuel from the high-pressure fuel line 124 into the engine fuel supply line 130 and operates the cooling fuel thermal expansion valve 128 associated with the selected candidate cooling body 138 to increase the flow rate of the fuel from the high-pressure fuel line 124 into the cooling body supply line 132 associated with such cooling body 138 in accordance with the portion determined at step 362.

At step 366, the TMSC 176 estimates the effect of passing the portion of the fuel through the cooling body 138 on the temperature of the fuel in the engine fuel supply line at the inlet 152 and updates the value ΔT in accordance with such estimate.

At step 368, the TMSC 176 determines if the value ΔT is greater than zero (i.e., additional heating of the fuel is necessary) and, if so, returns to step 356. Otherwise, the TMSC 176 returns to step 264 (FIG. 6) or step 282 (FIG. 7).

Figure 9:
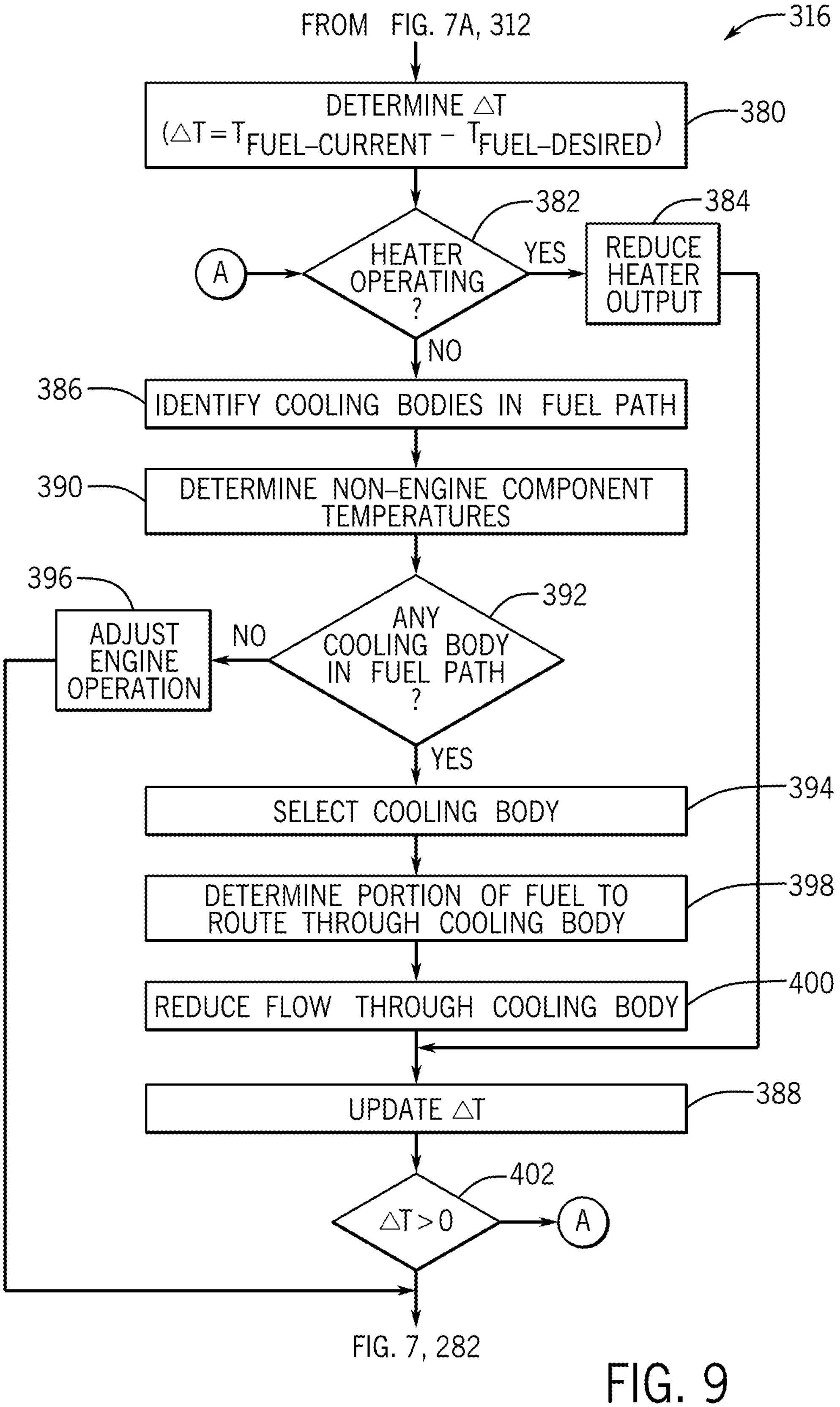
FIG. 9 is a flowchart of steps undertaken by the thermal management system of the engine system of FIG. 2 to cool fuel supplied to the engine thereof.

FIG. 9 is a flowchart that illustrates the steps undertaken by the TMSC 176 at step 312 of FIG. 7A to lower the temperature of the fuel in the engine fuel supply line 130 at the inlet 152 of the engine fuel thermal expansion valve 148.

At step 380, the TMSC 176 determines a value ΔT that represents an amount the temperature of the fuel in the engine fuel supply line 130 needs to be reduced. At step 382, the TMSC 176 determines if the heater 156 is operating and if so proceeds to step 384. Otherwise, the TMSC 176 proceeds to step 386. At step 384, the TMSC 176 reduces the output of or turns off the heater 156 in accordance with the value ΔT and proceeds to step 388 (described further below).

If the TMSC 176 determines the heater 156 is not operating at step 382, the TMSC 176 identifies the cooling bodies 138 (if any) that are in the fuel path between the high-pressure fuel line 124 and the engine fuel supply line 130 at step 386 and determines the temperatures of non-engine heat-generating components 140 associated with the identified cooling bodies 138 (if any) at step 390. At step 392, the TMSC 176 determines if there are any cooling bodies 138 in the fuel path and if so proceeds to step 394. Otherwise, at step 396, the TMSC 176 generates and transmits a signal and/or data to the supervisory controller 174 that the TMSC 176 is unable to cool the fuel sufficiently and that engine operation must be adjusted to cause the engine to cool in other ways (e.g., by a power derate of the engine, adjusting operating of the EGR system 96, adjusting spark timing, and the like). After step 396, the TMSC 176 returns to step 282 (FIG. 7).

At step 394, the TMSC 176 selects a cooling body 138 in the fuel path that is associated with a non-engine heat-generating component 140 having a temperature sufficiently low that cooling of the non-engine heat-generating component 140 may be suspended without harm. At step 398, the TMSC 176 determines how much to reduce the flow rate of the fuel supplied from the high-pressure fuel line 124 into the cooling body supply line 132 associated with the selected cooling body 138 and how much to increase the flow rate from the high-pressure fuel line 124 directly into the engine fuel supply line 130.

At step 400, the TMSC 176 adjusts the cooling fuel thermal expansion valve 128 that supplies fuel to the selected cooling body 138 and the throttle valve 126 in accordance with the flow-rate adjustments determined at step 398. Thereafter, the TMSC 176 proceeds to step 388. At step 388, the TMSC 176 estimates the effect of reducing the output of the heater 156 at step 384 or increasing the flow of fuel directly into engine fuel supply line 130 and updates the value ΔT accordingly. At step 402, the TMSC 176 determines if the updated value ΔT is greater than zero and if so, returns to step 382. Otherwise, the TMSC 176 returns to step 282 (FIG. 7).

Referring to FIGS. 6 and 7, as described above the TMSC 176 determines a temperature of the air-fuel mixture (or air-fuel-exhaust mixture) at step 260 (FIG. 6) and step 294 (FIG. 7) for optimal operation of the engine 50. In some cases the TMSC 176 may prioritize cooling of the work vehicle 10 components and may select a higher air-fuel or air-fuel-exhaust mixture temperature, for example, if the work vehicle 10 is started with a cold engine 50, when the components of the engine system 18 need to be warmed (e.g., if the coolant temperature in a radiator is low), the ambient air temperature is low, the engine 50 is operated with a low engine load, unstable combustion is detected, or there is an urgent need to cool vehicle engine components and/or non-engine heat-generating components 140 including, for example, the hydraulic system, the transmission, the engine 50, the electrical system, and/or the operator cabin. In such cases, the TMSC 176 prioritizes cooling of the components of the work vehicle 10 over cooling of the air-fuel or air-fuel-exhaust mixture.

In other cases, the TMSC 176 prioritizes cooling the air-fuel or air-fuel-exhaust mixture, for example, if the exhaust temperatures are too high, abnormal combustion (knock, pre-ignition, etc.) is detected, the quality of fuel is low or has a low octane, the ambient air temperature is high, the work vehicle 10 is operated at a high altitude, or the engine system 18 is operated with a high engine load.

Although the embodiments disclosed herein are described in connection with a vehicle having a spark ignition engine, it should be apparent to one who has ordinary skill in the art that aspects of these embodiments may be adapted to other types of vehicles having other types of engines to provide thermal control of such vehicle. The thermal management system disclosed in the foregoing may be used to provide thermal management of spark ignition and compression ignition engines as both types of engines would benefit from active control of the fuel/air mixture as described herein. In some embodiments, a compression ignition engine may use direct injection of the fuel under relatively high pressure (e.g., 1000 bar) compared to a spark ignition engine, which may use port fuel injection at relatively lower injection pressure (e.g., 10 bar). Further, aspects of such embodiments may even be used in other types of engines or motors not associated with vehicles as appropriate.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A thermal management system for a work vehicle having an engine and a non-engine heat-generating component, the thermal management system comprising:

a fuel tank configured to store fuel in a liquid or gaseous state;

fuel lines configured to deliver the fuel from the fuel tank to the engine and the heat-generating component;

a throttle valve coupled to the fuel lines intermediate the fuel tank and the engine and configured to selectively deliver the fuel to the engine for combustion and to the non-engine heat-generating component for cooling; and a thermal expansion valve coupled to the fuel lines intermediate the throttle valve and the engine and the non-engine heat-generating component, the thermal expansion valve having an orifice configured to effect a pressure reduction in the fuel including, when the fuel is in a liquid state, converting the fuel to a gaseous state;

wherein the throttle valve is selectively controlled to deliver the fuel from the fuel tank to the non-engine heat-generating component such that the pressure reduction of the fuel caused by the thermal expansion valve absorbs thermal energy for cooling the non-engine heat-generating component after which the fuel utilized for cooling is delivered to the engine for combustion.

2. The thermal management system of claim 1, wherein the throttle valve directs some of the fuel directly to the engine for combustion and some of the fuel to the non-engine heat-generating component for cooling.

3. The thermal management system of claim 1, wherein the fuel lines, the throttle valve, and the thermal expansion valve are further configured to selectively deliver the fuel from the fuel tank to cool a heat-generating component of the engine after which the fuel is delivered to the engine for combustion.

4. The thermal management system of claim 3, wherein the heat-generating component of the engine is an intake manifold, an exhaust manifold, a piston-cylinder arrangement, and a fuel injector.

5. The thermal management system of claim 3, further including a controller having a processing and memory architecture and configured to execute instructions to determine a cooling requirement of the non-engine heat-generating component or the heat-generating component of the engine and operate the throttle valve and the thermal expansion valve in accordance with the cooling requirement.

6. The thermal management of claim 1, further including an air intake arrangement to deliver ambient air to the engine, wherein the fuel absorbs thermal energy from the ambient air delivered to the engine and the air intake arrangement is free of both an intercooler and a charged air cooler.

7. The thermal management system of claim 1, wherein the non-engine heat-generating component a hydraulic component, an electrical component, a radiator, a transmission, an exhaust gas recirculation system, or a charge air cooler.

8. The thermal management system of claim 1, further including a heater disposed between the orifice and an engine fuel intake of the engine to heat the fuel.

9. The thermal management system of claim 1, wherein the fuel is a liquid petroleum gas, ethanol, methanol, methane, ammonia, natural gas, hydrogen, or a mixture thereof.

10. A method of cooling an engine and a non-engine heat-generating component of a work vehicle comprising:

operating a throttle valve coupled to fuel lines intermediate a fuel tank and the engine to selectively deliver the fuel to the engine for combustion and to the non-engine heat-generating component for cooling;

operating a thermal expansion valve coupled to the fuel lines intermediate the throttle valve and the engine and the non-engine heat-generating component to effect a pressure reduction to absorb thermal energy for cooling the non-engine heat-generating component; and delivering the fuel utilized for cooling to the engine for combustion.

11. The method of claim 10, wherein the step of operating the throttle valve includes directing some of the fuel directly to the engine for combustion and some of the fuel to the non-engine heat-generating component for cooling.

12. The method of claim 10, wherein the steps of operating the throttle valve and the thermal expansion valve include selectively delivering the fuel from the fuel tank to cool a heat-generating component of the engine after which the fuel is delivered to the engine for combustion.

13. The method of claim 12, wherein the heat-generating component of the engine is an intake manifold, an exhaust manifold, a piston-cylinder arrangement, and a fuel injector.

14. The method of claim 12, wherein the steps of operating the throttle valve and the thermal expansion valve include determining, by a controller having a processing and memory architecture, a cooling requirement of the non-engine heat-generating component or the heat-generating component of the engine and operating the throttle valve and the thermal expansion valve in accordance with the cooling requirement.

15. The method of claim 10, wherein the steps of operating the throttle valve and the thermal expansion valve include operating the throttle valve and the thermal expansion valve to cool ambient air drawn through an air intake arrangement coupled to the engine such that the ambient air is delivered to the engine without being cooled by an intercooler or a charged air cooler.

16. The method of claim 10, wherein the non-engine heat-generating component a hydraulic component, an electrical component, a radiator, a transmission, an exhaust gas recirculation system, or a charge air cooler.

17. The method of claim 10, wherein the fuel is a liquid petroleum gas, ethanol, methanol, methane, ammonia, natural gas, hydrogen, or a mixture thereof.

18. A control system for thermal management of a work vehicle having an engine and a non-engine heat-generating component, the control system comprising:

fuel lines configured to deliver the fuel from the fuel tank to the engine and the heat-generating component, the fuel tank configured to store the fuel in a liquid or gaseous state;

a controller having a processing and memory architecture and configured to execute instructions to:

operate a throttle valve coupled to the fuel lines intermediate the fuel tank and the engine to selectively deliver the fuel to the engine for combustion and to the non-engine heat-generating component for cooling;

operate a thermal expansion valve coupled to the fuel lines intermediate the throttle valve and the engine and the non-engine heat-generating component to effect a pressure reduction to absorb thermal energy for cooling the non-engine heat-generating component; and deliver the fuel utilized for cooling to the engine for combustion.

19. The control system of claim 18, wherein the controller is configured to operate the throttle valve to direct some of the fuel directly to the engine for combustion and some of the fuel to the non-engine heat-generating component for cooling.

20. The control system of claim 18, wherein the controller is configured to operate the throttle valve and the thermal expansion valve to selectively deliver the fuel from the fuel tank to cool a heat-generating component of the engine after which the fuel is delivered to the engine for combustion.

* * * * *